(12) United States Patent
Gassner

(10) Patent No.: US 8,172,070 B2
(45) Date of Patent: May 8, 2012

(54) DEVICE FOR SEPARATING AND ALIGNING THE POSITION OF METAL CONTAINER SEALS

(75) Inventor: Wolfgang Gassner, Frankenmarkt (AT)

(73) Assignee: Gassner GmbH, Frankenmarkt (AT)

( * ) Notice: Subject to any disclaimer, the term of this patent is extended or adjusted under 35 U.S.C. 154(b) by 0 days.

(21) Appl. No.: 13/066,510

(22) Filed: Apr. 15, 2011

(65) Prior Publication Data

US 2011/0258965 A1    Oct. 27, 2011

Related U.S. Application Data

(63) Continuation of application No. PCT/EP2009/063672, filed on Oct. 19, 2009.

(30) Foreign Application Priority Data

Oct. 17, 2008 (AT) ................................ GM597/2008

(51) Int. Cl.
  *B65G 47/24* (2006.01)
(52) U.S. Cl. ............... 198/396; 198/397.06; 198/397.01
(58) Field of Classification Search ............ 198/397.01, 198/397.03, 393, 396
  See application file for complete search history.

(56) References Cited

U.S. PATENT DOCUMENTS

| 1,933,320 | A | 10/1933 | Eaton et al. |
| 3,106,281 | A | 10/1963 | Mottin |
| 4,081,069 | A | 3/1978 | Ono |
| 4,735,343 | A * | 4/1988 | Herzog .................... 198/397.06 |
| 5,333,718 | A | 8/1994 | Pannell et al. |
| 5,394,972 | A | 3/1995 | Aidlin et al. |
| 5,586,637 | A | 12/1996 | Aidlin et al. |
| 6,491,152 | B1 | 12/2002 | Evers, Jr. et al. |
| 7,040,489 | B2 * | 5/2006 | Zemlin et al. ................. 198/384 |
| 7,246,695 | B2 * | 7/2007 | Zemlin .................... 198/397.06 |
| 7,597,189 | B2 * | 10/2009 | Hinsley et al. ............. 198/690.2 |
| 7,850,403 | B2 | 12/2010 | Lorange et al. |
| 2005/0077216 | A1 | 4/2005 | Zemlin et al. |

FOREIGN PATENT DOCUMENTS

| DE | 19 18 627 | 11/1970 |
| DE | 1 933 320 | 1/1971 |
| DE | 2 306 329 | 9/1973 |
| DE | 36 03 159 | 8/1987 |
| DE | 197 00 512 | 7/1998 |
| DE | 100 52 062 | 9/2001 |
| DE | 10 2004 030 667 | 1/2006 |

(Continued)

OTHER PUBLICATIONS

International Search Report.

(Continued)

*Primary Examiner* — James R Bidwell
(74) *Attorney, Agent, or Firm* — Collard & Roe, P.C.

(57) ABSTRACT

Device for separation and position alignment of metallic container closures (21), as well as for conveying the separated and position-aligned container closures (21), preferably crown corks, to a further processing machine, preferably sealing machine. It is provided that a conveying unit (2) comprises a run (2*b*) of an endless conveyor belt or link belt or plate belt, which conveys the container closures (21), which run is guided along a permanently magnetic or electromagnetic conveyor track configured as a magnetic bar, lying on this track at least in sections, or at a slight distance from it, and conveys the container closures (21) out of the transfer station (8).

22 Claims, 20 Drawing Sheets

FOREIGN PATENT DOCUMENTS

| | | |
|---|---|---|
| EP | 0 699 605 | 3/1996 |
| FR | 2 876 990 | 4/2006 |
| GB | 1 297 845 | 11/1972 |
| JP | 54-000366 | 1/1979 |
| JP | 55-016827 | 2/1980 |
| JP | 57-065738 | 4/1982 |

OTHER PUBLICATIONS

Austrian Search Report dated Aug. 10, 2009 in Austrian Application No. GM 597/2008 with English translation of relevant parts.

* cited by examiner

DEVICE FOR SEPARATING AND ALIGNING THE POSITION OF METAL CONTAINER SEALS

CROSS REFERENCE TO RELATED APPLICATIONS

Applicant claims priority on and this application is a continuation under 35 U.S.C. §120 of International Application No. PCT/EP2009/063672 filed on Oct. 19, 2009, which claims priority under 35 U.S.C. §119 of Austrian Application No. GM 597/2008 filed on Oct. 17, 2008. The International Application under PCT article 21(2) was not published in English. Applicant claims priority under 35 U.S.C. §119 of Austrian Application No. GM 597/2008 filed on Oct. 17, 2008. The disclosures of the aforesaid International Application and Austrian application are incorporated by reference.

FIELD OF THE INVENTION

The present invention relates to a device for separation and position alignment of metallic container closures, as well as for conveying the separated and position-aligned container closures, preferably crown corks, to a further processing machine, preferably sealing machine, whereby the device comprises at least one supply container for the container closures, as well as at least one removal conveyor for removal and pre-orientation of the container closures from the at least one supply container, whereby the at least one removal conveyor has a steep conveying section in the operating position of the device, the conveying surface of which conveyor encloses an angle>30°, preferably >80°, with the support plane, as well as at least one conveying unit that contacts the container closures by means of a contact surface, at a reference surface of the container closures, in each instance, as well as a transfer station in which the container closures are blown out from the steep conveying section transverse to the conveying direction of the at least one removal conveyor, and by means of which station the container closures are passed on to the conveying unit in separated and position-oriented manner, whereby a first conveying section (37) of the at least one conveying unit (2) that conveys the separated and position-oriented container closures (21), disposed directly behind the transfer station (8), has a conveying direction component that faces away from the support plane (7) of the device.

STATE OF THE ART

Such devices are used in container filling operations and serve for precise feed of the container closures to a sealing machine, which attaches the container closures to the containers in order to seal them.

While earlier devices of this type were almost entirely disposed above the sealing machine, and therefore the separation and position alignment of the container closures took place practically directly above the open containers to be sealed, in recent times a transition has been made to carrying out the separation and the position alignment of the container closures away from the sealing machine, and as a result, the friction wear and dust that unavoidably occur during manipulation of the container closures are kept away from the open containers.

This led to the result that the container closures, which have already been separated and position-aligned, must be conveyed to the sealing machine over a longer distance, whereby the container closures are generally passed to the sealing machine from above, so that the container closures not only have to be conveyed over a horizontal distance, but also over a vertical distance. For this reason, usual devices are structured in such a manner that the container closures are first transported to a certain height, at the location of application, as unsorted or merely pre-sorted bulk material, and horizontal conveying to the sealing machine then takes place at this height. This has the advantage that the support plane of the device as such can be kept very small, and horizontal conveying of the container closures to the height (usual heights are approximately 3 m to 6 m) does not take up valuable floor space for other machines, since the space available directly underneath the conveying path that runs at the height can be used in another way.

Such devices are known, for example, from U.S. Pat. No. 6,491,152, U.S. Pat. No. 5,586,637, U.S. Pat. No. 1,933,320, and U.S. Pat. No. 5,394,972, having a removal conveyor that takes the container closures (crown corks) out of a supply container, pre-orients them, and immediately transports them to a height that lies above the height required for horizontal further conveying of the container closures. The reason for this is that the transfer station in which separation and position orientation of the container closures as well as transfer to a conveying unit as well as further transport on this conveying unit at this height take place, whereby the transfer station is configured in such a manner that the separation and position alignment take place by means of lateral push-out from the removal conveyor into a channel that is slightly inclined in the direction of the floor in a first section. However, this system has proven to be subject to problems, in practice, since for one thing, it has an unnecessarily high construction, namely higher than would actually be necessary with regard to the conveying unit, but on the other hand, and this is even more serious, the transfer station, in other words the region of separation and position alignment, takes place at a height that cannot be reached without auxiliary means. However, since the transfer station in such devices is that component of the device where problems due to jamming or defective container closures are most likely, maintenance and corrective measures in such devices are made much more difficult and/or the corrective measures take an unnecessarily long time.

Such a device is also known from DE 197 00 512 B4. Here, too, the transfer station is disposed at a great height, and the container closures have to be transported back to a lower height first, before they can be conveyed further horizontally.

A device for sorting and separating screw-on closures made of plastic is known from FR 2 876 990 A1, in which, although conveying of the screw-on closures to the sealing machine does take place at a certain height that is not accessible without auxiliary means, the transfer station is disposed close to the floor, for the reasons stated above. In order to convey the screw-on closures from the transfer station to the sealing machine and thus also to the aforementioned height, a blower is provided, which conveys the container closures upward from the transfer station, by means of an air stream. Such a device is not suitable for separation and position alignment of metallic container closures, particularly crown corks, since these are too heavy for being conveyed upward by means of an air stream.

PRESENTATION OF THE INVENTION

It is therefore the task of the present invention to create a device for separation and position alignment of metallic container closures, as well as for conveying the separated and position-aligned container closures, preferably crown corks, to a further processing machine, which device prevents these disadvantages, is maintenance-friendly, and allows easy access to the transfer station, without auxiliary means.

It is a further task of the present invention, in this connection, to take the particular requirements of metallic container closures, with regard to bending and scratching, into account while conveying them.

These tasks are accomplished by means of a device according to the invention.

In this connection, it is provided, in the case of a device for separation and position alignment of metallic container closures, as well as for conveying the separated and position-aligned container closures, preferably crown corks, to a sealing machine, whereby the device comprises at least one supply container and/or application unit for the container closures, as well as at least one removal conveyor for removal and pre-orientation of the container closures from the at least one supply container, whereby the at least one removal conveyor has a steep conveying section in the operating position of the device, the conveying surface of which section encloses an angle>30°, preferably >80°, with the support plane, as well as at least one conveying unit that transports the separated and position-aligned container closures to the sealing machine, which unit contacts the container closures by means of a contact surface, at a reference surface of the container closures, in each instance, as well as a transfer station in which the container closures are blown out from the steep conveying section transverse to the conveying direction of the at least one removal conveyor, and by means of which station the container closures are passed on to the conveying unit in separated and position-oriented manner, and whereby a first conveying section of the conveying unit that conveys the separated and position-aligned container closures, disposed directly behind the transfer station, has a conveying direction component that faces away from the support plane of the device, that the at least one conveying unit comprises a run of an endless conveyor belt or link belt or plate belt, which conveys the container closures, is guided along a permanently magnetic or electromagnetic conveyor track configured as a magnetic bar, lying on this track at least in sections, or at a slight distance from it, and conveys the container closures out of the transfer station.

The first conveying section disposed directly behind the transfer station is understood to be that region of the conveying unit that is independent of the transfer station, i.e. on which the container closures are already completely separated and position-oriented, and in which conveying section conveying of the container closures takes place exclusively on the basis of the conveying movement of the conveying unit, i.e. no superimposed movement with other drives takes place.

Because of this, the result is brought about that the removal conveyor actually serves almost exclusively for removal of the container closures from the supply container as well as for pre-orientation of the closures, but is not used to transport the container closures over a noteworthy distance in the direction toward the sealing machine, or to transport the container closures to a certain height, in order to then separate them at this height and pass them on to the conveying unit in position-oriented manner.

The circumstance that the at least one conveying unit that transports the container closures, already separated and position-oriented, has a conveying direction component that faces away from the support plane of the device, furthermore brings about the result that rapid separation and position-orientation of the container closures, with reference to the application of same, can take place, and as a further consequence, this leads to the result that the transfer station in which the separation position orientation of the container closures takes place and which has an increased likelihood of problems, can already be disposed at a lower height, which can be reached even without auxiliary means such as ladders or platforms. In this connection, the term transfer station is understood to mean any type of section of the device in which a transfer of the non-oriented or pre-oriented container closures to a conveying unit takes place, on which further conveying of the container closures in a separated and position-oriented alignment then takes place.

In connection with ferro-metallic container closures, a particularly simple and secure transport possibility of the closures is obtained in this manner.

According to a further preferred embodiment variant of the invention, it is provided that a second conveying section of the at least one conveying unit, which follows the first conveying section and runs essentially horizontal in the operating position of the device, is provided, whereby the curvature axis of the transition between the two conveying sections runs parallel to the contact surface of the conveying unit or to the reference surface of the container closures transported on the conveying unit, and the transition preferably takes place in deflection-roller-free manner and with a large radius. More secure transport of the container closures is possible by means of the deflection of the container closures "toward the rear" by way of their reference surface. On the one hand, the greatest possible surface area of the container closure will be selected as the reference surface, for example the back side of crown corks, and on the other hand, it is prevented, because of the deflection "toward the rear" by way of this surface, that the container closures can move on the conveying unit, which would lead to undesirable friction wear, on the one hand, and on the other hand also optically impairs the container closures, something that would not be accepted by the end customer.

The preferably deflection-roller-free transition between the first and the second conveying section of the conveying unit allows particularly gentle deflection, on the one hand, and a constant magnetic holding force even in this deflection region, on the other hand.

According to another preferred embodiment variant of the invention, it is provided that the transfer station is disposed at a height, measured from the support plane of the device, between 1 m and 3 m, preferably between 1 m and 2 m. In this way, it is situated at an ideal height so as to be maintained or repaired without auxiliary means. Problems can therefore be corrected by the operating personnel immediately, in contrast to the devices of the same type known from the state of the art, without having to climb up onto ladders or platforms. Also, the tool necessary for repair or maintenance that might be required does not have to be lifted to a height of 4 m to 6 m.

In another preferred embodiment of the invention, it is provided that the transfer station is disposed directly next to the at least one removal conveyor and comprises a bottom disposed essentially parallel to the steep conveying section of the removal conveyor, as well as a lid, whereby at least one charging opening is provided, by way of which the container closures can be conveyed from the removal conveyor into the transfer station. By means of the configuration of the transfer station as a chamber, the advantage is obtained that container closures, pre-oriented if necessary, can be transported from multiple removal conveyors into the transfer station. Furthermore, as a result of disposing removal conveyor and transfer station next to one another, a reduction in the construction height of the device is achieved.

According to another preferred embodiment variant of the invention, it is provided that the distance between bottom and lid of the transfer station allows charging of the transfer station with container closures from the side, from the at least one removal conveyor, with reference to their reference surface, only in that position in which the container closures are transported in the removal conveyor. The transfer station therefore forms a compulsory guide for the container closures, so that these can be transferred into the transfer station without losing the pre-orientation that they have had forced on them by the removal conveyor.

In another preferred embodiment variant of the invention, it is provided that a partial section of the at least one conveying unit forms a section of the bottom of the transfer station, so that the container closures conveyed into the transfer station and pre-oriented, by the at least one removal conveyor, come to lie on the conveying unit with their reference surface as a function at least of the amount and of the geometry of the transfer station, in accordance with the principle of randomness. Because of the circumstance that the conveying unit is configured to be magnetic, it can therefore be guaranteed that the metallic container closures are transferred further, out of the transfer station, by the conveying unit, whereby influence can be taken on the separation performance of the transfer station, by means of the geometrical configuration of the transfer station and/or by means of the strength, size, and arrangement or shape of the magnetic field.

In order to allow problem-free transfer of the container closures to the conveying unit, the transfer point, in other words that pre-determined region of the transfer station at which the container closures are necessarily entrained by the conveying unit, is configured either as the lowest or as the highest point of a lower delimitation wall of the transfer station, in the operating position of the device, which wall connects bottom and lid of the transfer station with one another.

In the case of the placement of the transfer point as the lowest point of the lower delimitation wall, in the operating position of the device, this point is disposed below the at least one charging opening in the operating position of the device.

The container closures conveyed into the transfer station out of the removal conveyor, by way of the charging opening, fall in the direction of the lowest point in this manner, and are then conveyed further by means of the conveying unit, in separated and position-aligned manner.

In the case of placement of the transfer point as the highest point of the lower delimitation wall, in the operating position of the device, this point can be disposed not only above but also below or at the same height as the at least one charging opening.

Not only in the case of the configuration of the transfer point as the highest point of the lower delimitation wall but also in the case of the configuration as the lowest point of the lower delimitation wall, the transfer point is positioned, in any case, above or ahead of (depending on how one looks at it) of the at least one conveying unit provided in the bottom of the transfer station. This configuration of the lower delimitation wall has the advantage that no container closures can hinder the removal, which takes place in an upward direction, of the container closure that has already been acquired by the conveying unit for transport out of the transfer station.

In a particularly preferred embodiment variant of the invention, the at least one removal conveyor is an endless link belt conveyor preferably manufactured from corrosion-resistant and/or acid-resistant steel, having a flat conveying section that submerges into the supply container, the individual links of which section, seen in the conveying direction, have a first end section that carries an entrainment element provided with a bevel, and a second end section in which the links are preferably configured to be turned up, and the region between the entrainment element and the preferable turn-up is provided for accommodating the container closures in a row, next to one another. Production of the link belt conveyor from corrosion-resistant and/or acid-resistant steel has the advantage that it does not become statically charged and is very wear-resistant, something that is particularly important in the case of crown corks as container closures, since these have a very abrasive effect at the crown. The region between entrainment element and turn-up can be coordinated with the size of the container closures, in simple manner. The shape of the entrainment element is ideally coordinated with the shape of the container closure. The reduction in the incline of the flat conveying section relative to the steep conveying section allows increasing the occupation density of the removal conveyor.

According to a particularly preferred embodiment variant of the invention, it is provided that at least one blow-out opening controlled by a blower unit is disposed in the region of the at least one charging opening, in order to convey the container closures from the at least one removal conveyor into the transfer station, row by row. In this connection, they can be conveyed into the transfer station either one row at a time, or multiple rows at the same time.

At the same time, an additional air guide element can be provided, which is disposed to run parallel to the lid, preferably to be an integral part of the lid, to cover at least one region of the steep conveyor section as well as at least one region of the transfer station, and has openings/slits directed into the transfer station and/or onto the steep section, controlled by a blower unit, in order to convey the container closures from the steep conveying section, row by row, into the transfer station, on the one hand, and to convey the container closures that are already situated in the transfer station in the direction of the transfer point, on the other hand.

Particularly in connection with the configuration of the transfer point as the highest point of the lower delimitation wall of the transfer station, the additional air guide element proves to be advantageous, since in this case, additional air amounts are necessary to convey the container closures to the transfer point that lies higher, counter to the force of gravity.

In another preferred embodiment variant of the invention, the conveying velocity of the at least one conveying unit amounts to a multiple of the conveying velocity of the at least one removal conveyor. Since the blow-out process of the at least one removal conveyor always conveys multiple container closures into the transfer station, it is provided, according to the invention, to operate the at least one conveying unit at a higher conveying velocity, in order to avoid congestion of the container closures in the transfer station.

According to another preferred embodiment variant of the invention, it is provided that the width of the run of the conveyor belt of the at least one conveying unit is less than or equal to the greatest width of the container closures to be conveyed. In order to prevent multiple container closures from being accidentally entrained by the at least one conveying unit at the same time, and therefore no separation in the actual sense taking place, it is necessary to use the adhesive force made available by the magnetic conveyor track in correspondingly metered manner. By means of restricting the maximal width of the run, it can be prevented, on the one hand, that further container closures adhere to the conveying unit, to the left and the right next to the container closure adhering to the conveying unit, like a cluster of grapes, but on the other hand, in this way, it is prevented, to a great extent, that the magnetic force is passed on by a container closure that is already adhering to the conveying unit.

According to another preferred embodiment variant of the invention, it is provided that the steep conveying section of the removal conveyor, bottom and lid of the transfer station, as well as the first conveying section of the conveying unit are disposed to run vertically. Such an arrangement allows a particularly space-saving embodiment variant with regard to the support plane of the device according to the invention.

According to the invention, it can also be provided that a magnetic system is disposed on the side of the at least one removal conveyor that faces away from the entrainment elements of the steep conveying section, in order to bind the container closures to the removal conveyor more strongly in this region, and to prevent jamming caused by them falling down.

As a particularly preferred embodiment variant of the invention, it is provided that two removal conveyors that run parallel to one another are provided, and the transfer station as well as a conveying unit that transports the separated and position-aligned container closures to the sealing machine is disposed between the removal conveyors, whereby the transfer station has two charging openings. Such a device according to the invention has proven to be particularly efficient, since the transfer station can be charged on both sides, and the conveying velocities of the removal conveyors as well as of the conveying unit can be optimally coordinated with one another, in that the conveying velocity of the conveying units is selected to be slower, in order to allow scooping the container closures out of the supply container at an optimal degree of effectiveness, and, on the other hand, however, the conveying velocity of the conveying unit can be increased, without problems, in such a manner that the container closures conveyed from the removal conveyors into the transfer station can be transported out of the transfer station and further, by the conveying unit, in separated and position-aligned manner, without problems.

With reference to an embodiment variant having two removal conveyors, a preferred embodiment variant provides that the relative position of the two removal conveyors with regard to one another is constant during conveying, and either the entrainment elements on the individual links are always positioned differently with reference to their vertical distance from the support plane of the device, or the two charging openings have a different vertical distance from the support plane of the device. As a result, it is guaranteed that charging of the transfer station is always fulfilled by the two removal conveyors with time offset.

In this case, another preferred embodiment variant provides that the lower delimitation wall of the transfer station is configured in V shape, whereby each shank connects the lowest point of a charging opening, in each instance, with the lowest point of the transfer station, with reference to the support plane. In this way, the container closures can fall into the transfer station from both sides, and are automatically directed onto the conveying unit, which is disposed in the center.

In another preferred embodiment variant of the invention, it is provided that an application unit is provided between the two removal conveyors and below the transfer station, in the operating position of the device, which unit has a preferably wedge-shaped bulk material distributor that divides the container closures to be separated and position-aligned and fed to a sealing machine, between the two removal conveyors. The container closures can thereby be fed to the device according to the invention in automated manner, and division onto the two removal conveyors then takes place by means of the bulk material distributor, which, in a particularly preferred embodiment variant of the invention, is movably disposed between the removal conveyors, in order to be able to influence the division ratio of the container closures that are applied, between the two removal conveyors, not only but also under the stream of the container closures that are being fed in from outside of the device.

According to another preferred embodiment variant of the invention, it is provided that a gravity channel is disposed between conveying unit and further processing machine, which channel has a guide track on which the container closures slide in the direction toward the further processing machine, due to gravity, and the guide track is formed from plastic, preferably polyethylene, or is provided with a coating composed of plastic, preferably polyethylene, at least in the contact region with the container closures. In this way, the container closures are handled gently during the fall in the direction of the further processing machine, something that is very important, particularly in the case of crown corks as container closures, since these are not allowed to have any wear phenomena on their visible surface.

Below, a detailed description of the invention now follows, on the basis of an exemplary embodiment, namely a device for separation and position alignment of crown corks, as well as for conveying the separated and position-aligned crown corks, to a sealing machine.

WAYS OF IMPLEMENTING THE INVENTION

Figure 1:
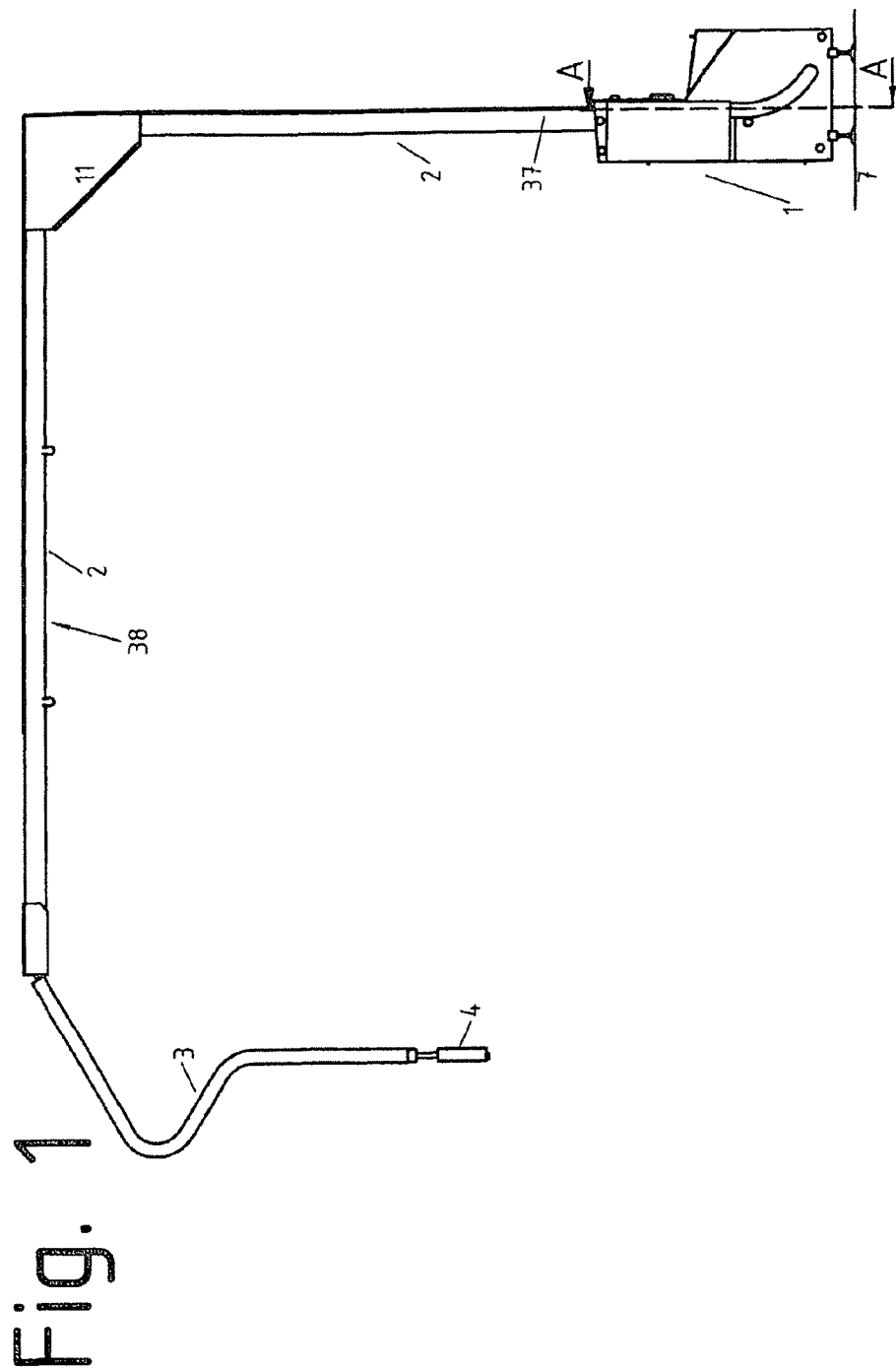
FIG. 1 a side view of a device according to the invention
Figure 2:
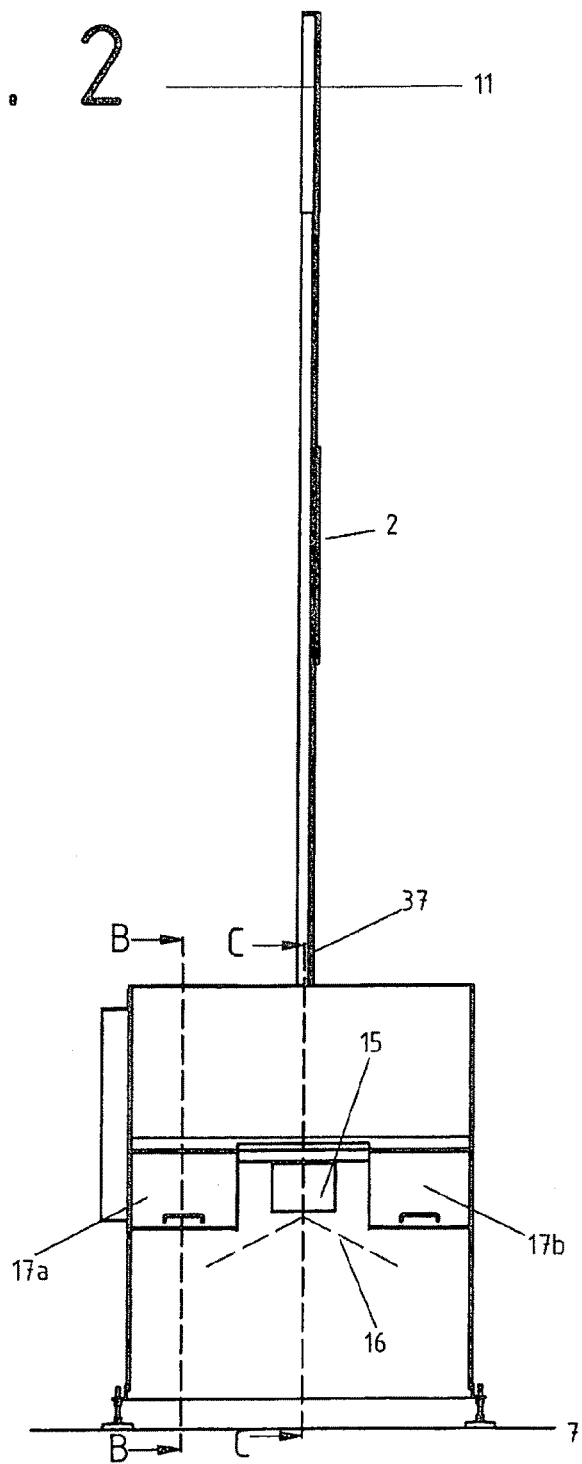
FIG. 2 a front view of a device according to the invention

FIG. 1 and FIG. 2, in each instance, show a side view and a front view, respectively, of a device according to the invention, for separation and position alignment of crown corks as well as for conveying the separated and position-aligned crown corks to a sealing machine (not shown). The device according to the invention comprises a machine cabinet 1 as well as a conveying unit 2 and a movable gravity channel 3, which is provided with an end piece 4, which can be coupled with a sealing machine (not shown).

Figure 3:
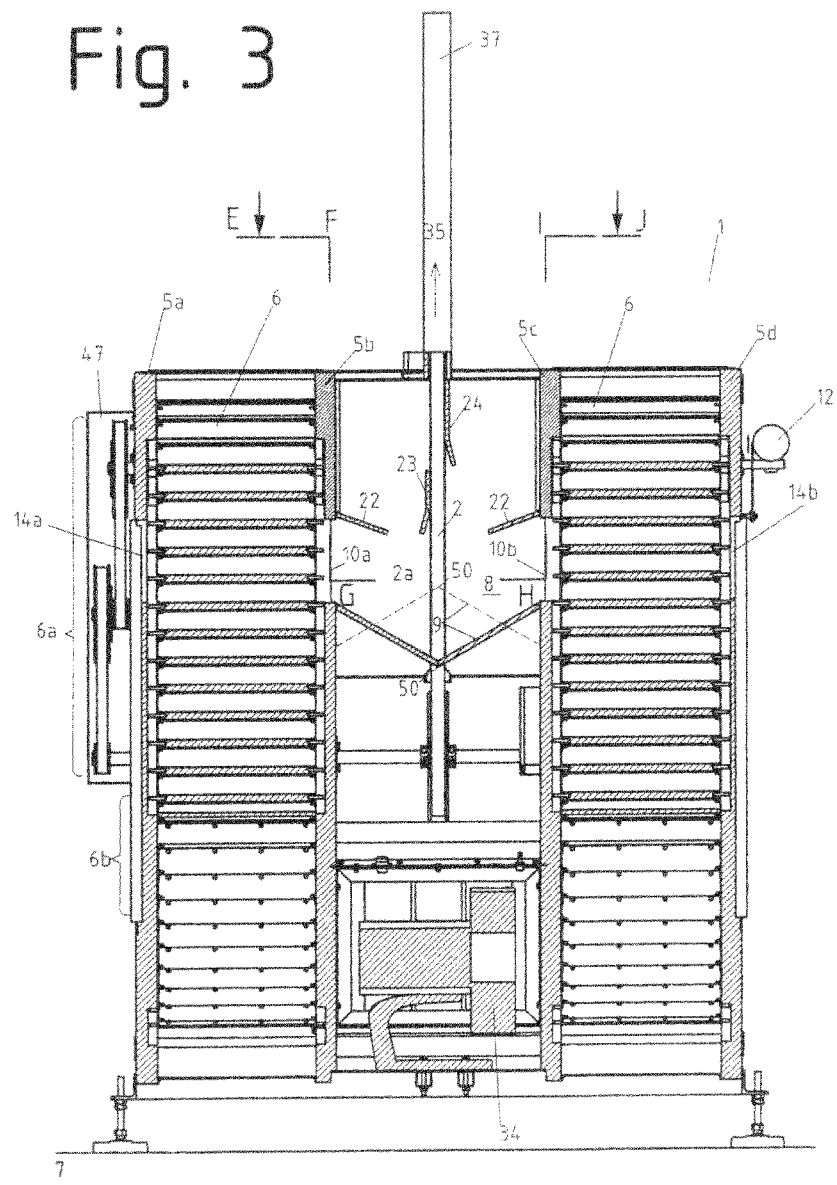
FIG. 3 a sectional view through a device according to the invention, along section line AA from FIG. 1
Figure 4:
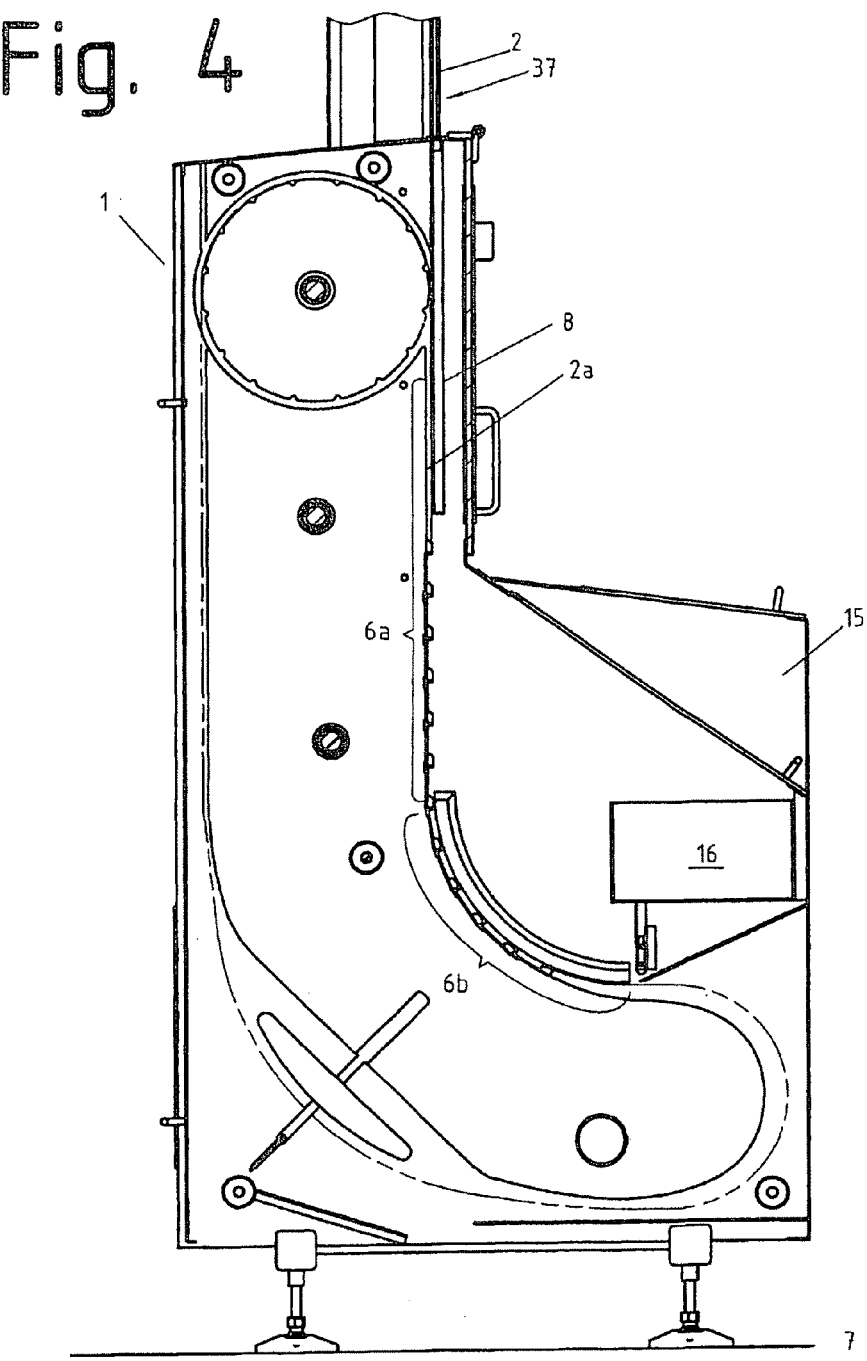
FIG. 4 a sectional view through a device according to the invention, along section line BB from FIG. 2
Figure 5:
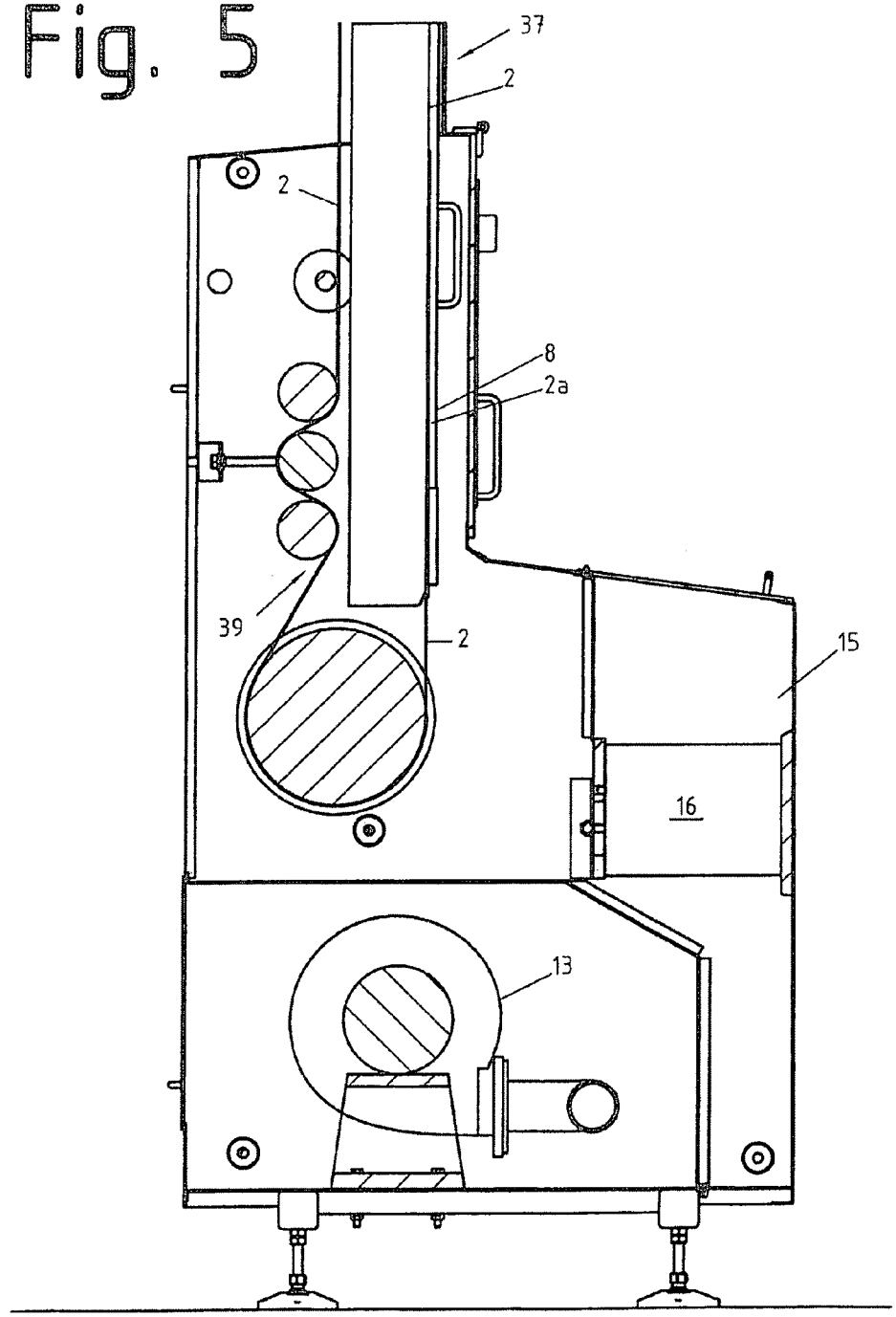
FIG. 5 a sectional view through a device according to the invention, along section line CC from FIG. 2

FIG. 3, FIG. 4, and FIG. 5 show a sectional view through a device according to the invention, along section line AA from FIG. 1 and BB from FIG. 2 and CC from FIG. 2, respectively, so that the machine box 1 is shown in section. This has a simple basic structure composed of four plastic panels 5a, 5b, 5c, 5d, which are connected by way of bracing screws, not shown, and form the framework for all the components situated within them. Furthermore, all the required guides, air supply channels, bearing seats, bores, etc., are worked into the plastic panels 5a, 5b, 5c, 5d.

A removal conveyor 6 in the form of a link belt conveyor is disposed, in each instance, between the plastic panels 5a and 5b as well as 5c and 5d, which conveyor has a steep conveying section 6a and a flat conveying section 6b. In this connection, the steep conveying section 6a is inclined at an angle>30°, preferably >80° relative to the support plane 7, in other words, in FIG. 3, disposed to run inclined into the plane of the drawing or parallel to the plane of the drawing. The angle between flat conveying section 6b and support plane 7 is selected to be <10°. The flat conveying section 6b can also run parallel to the support plane, in other words horizontally.

It is obvious to a person skilled in the art that the placement of two removal conveyors is meant purely as an example, and that a device for separation and position alignment of container closures that demonstrates the advantages of the invention can also have only one removal conveyor, with otherwise essentially the same structure, as will still be described below.

Figure 11:
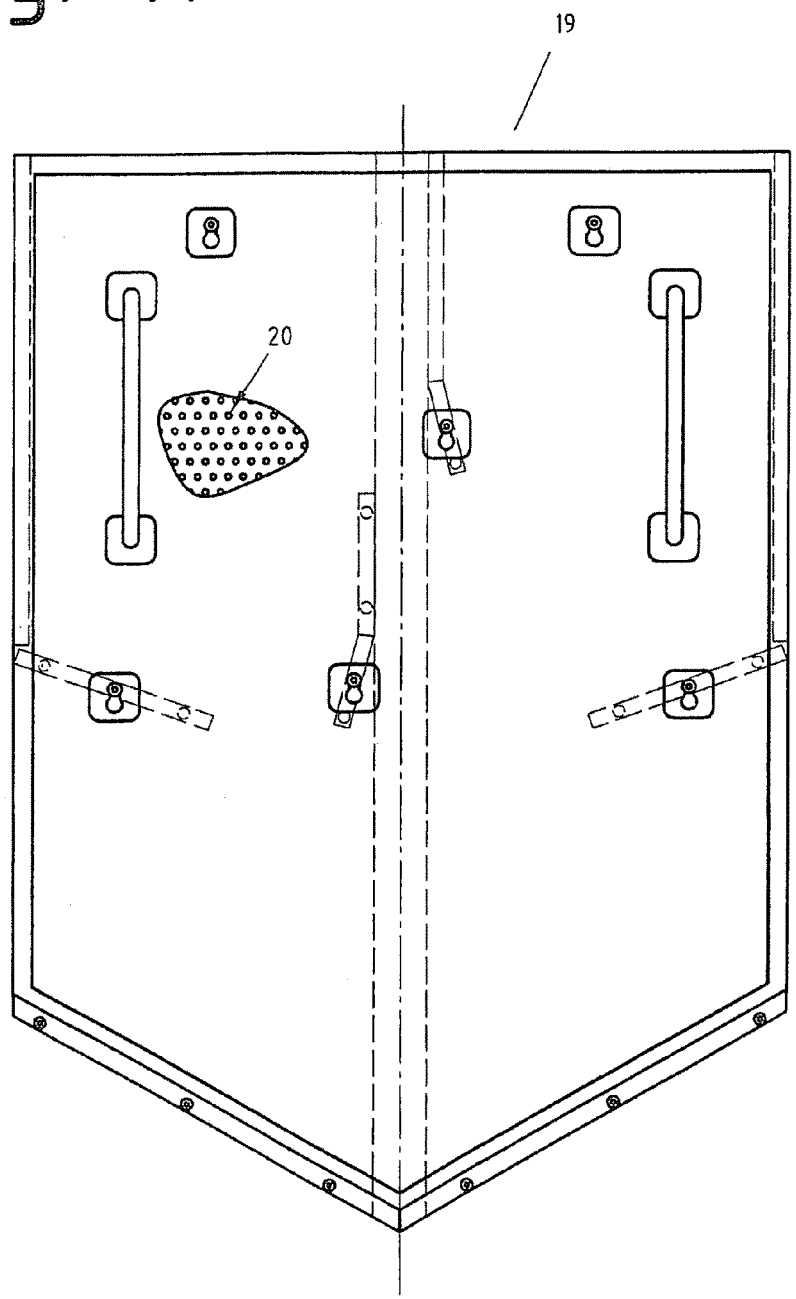
FIG. 11 a detail view of the lid of the transfer station

A chamber-like transfer station 8 is disposed centered between the two removal conveyors and between the plastic panels 5b and 5c, which station is delimited, on the one hand, by a bottom 18 that runs parallel to the plane of the drawing, and a lid 19 having exhaust air openings 20 (see FIG. 11), which runs parallel to this bottom 18, and, on the other hand, by a lower delimitation wall 9, in the direction of gravity, and is open in the direction of the removal conveyors 6, by way of charging openings 10a, 10b in the plastic panels 5b and 5c.

A conveying unit 2 is disposed between the removal conveyors 6, also centered, which unit runs through the transfer station 8 and forms a section of the bottom 18 of the transfer station 8 in a partial section 2a.

A drive device 12 together with translation gear mechanism 47 for the moving parts of the device according to the invention, as well as blow-out openings 14a, 14b in the plastic panels 5a and 5d, respectively, which are supplied with air by way of a blower unit 13 (see FIG. 5) and guides the latter transverse to the conveying direction of the removal conveyors 6, on its links 29, can also be seen in FIG. 3. In this connection, the air guide channels are worked into the plastic panels 5a, 5d.

A filter packet 34, preferably a high-surface filter for sterile air, is disposed in the suction path of the blower unit 13. A difference pressure manometer measures the pressure difference ahead of and behind the filter, and thereby determines the degree of contamination of the filter.

Figure 13:
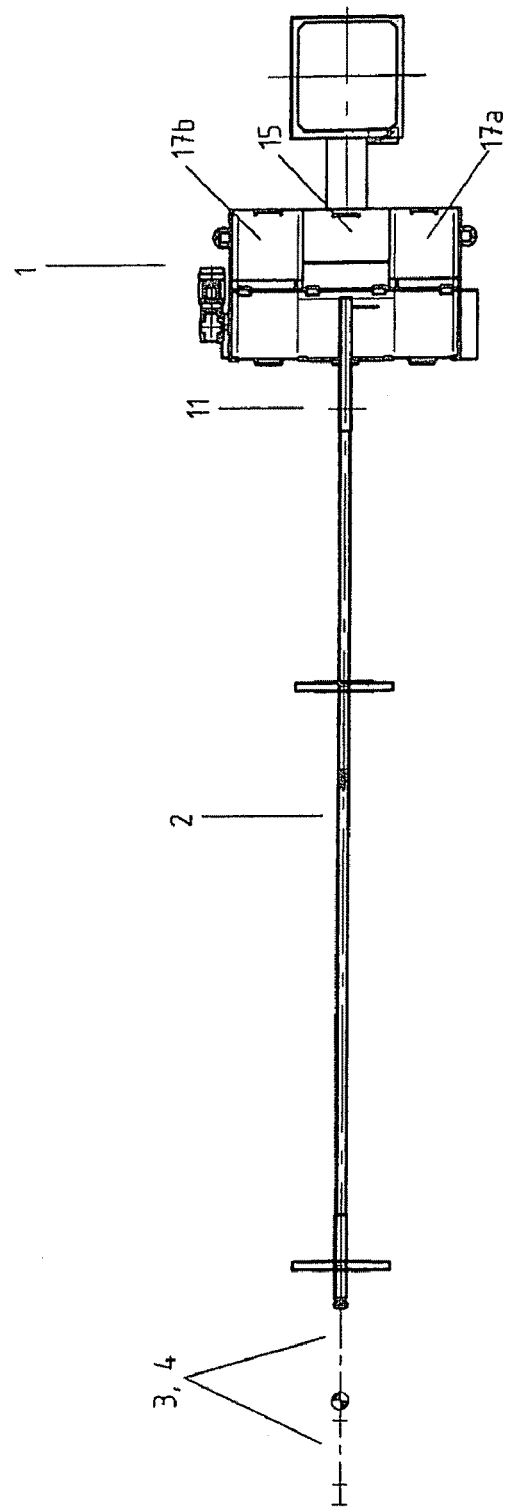
Figure 14:
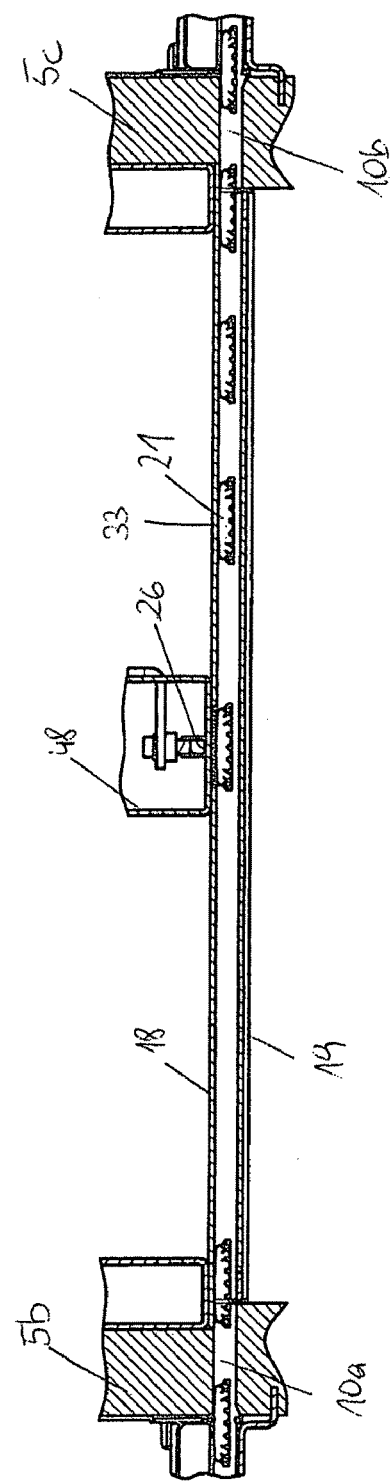
Figure 15:
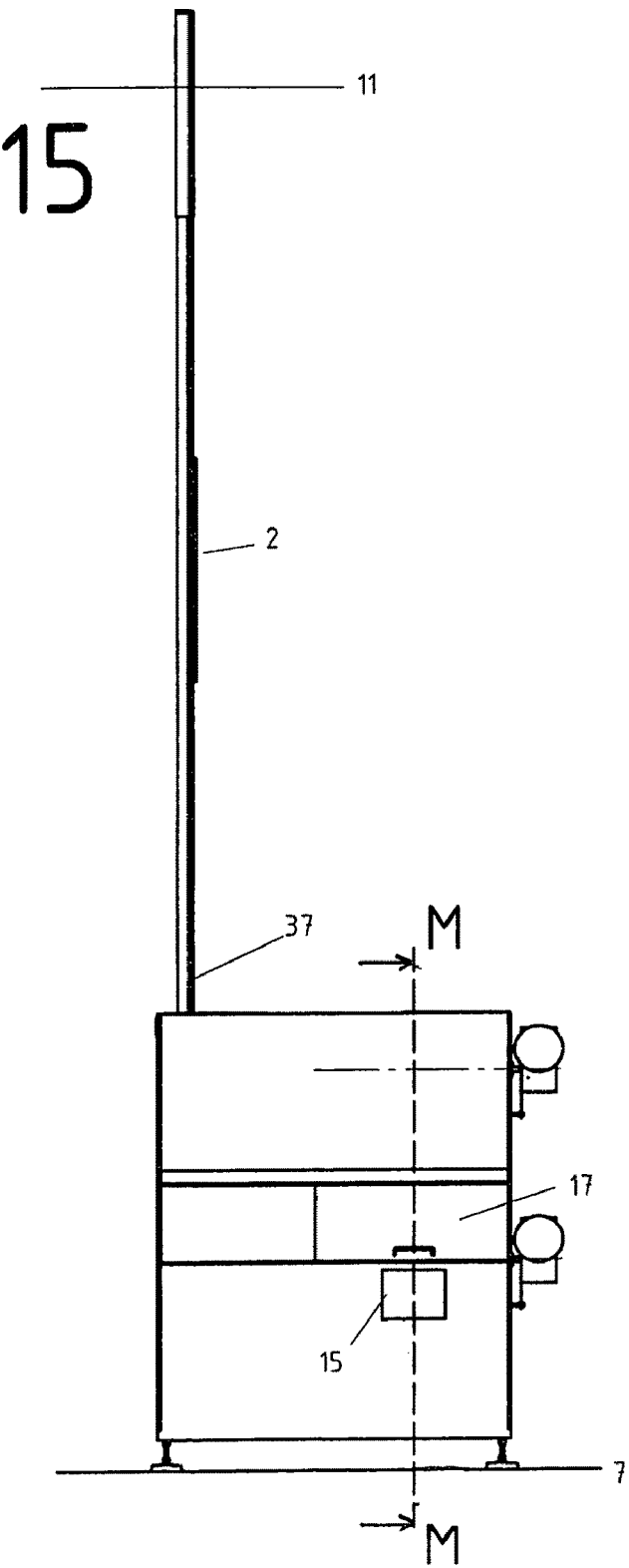
FIG. 15 a front view of an alternative embodiment variant of the device according to the invention FIG. 16 a side view of the alternative embodiment variant of the device according to the invention FIG. 17 a sectional view through the alternative embodiment variant of the device according to the invention, along section line AA from FIG. 16

FIG. 4 and FIG. 5 particularly also show an application unit 15, in which a bulk material distributor 16 is disposed, which divides the crown corks, which are preferably conveyed to it in automated manner, between supply containers 17a, 17b (see also FIG. 13) disposed to the left and to the right next to the bulk material distributor 16. The bulk material distributor 16, in its holder 27, is disposed so as to be displaceable to the left or to the right, closer to the one supply container 17a, 17b or the other, by means of an adjustment device 28, for example a servo-motor or a pneumatic or hydraulic cylinder, in order to be able to influence the division ratio of the crown corks 21 applied by way of the application unit 15, between the two supply containers 17a, 17b, and thus between the two removal conveyors 6.

Figure 6:
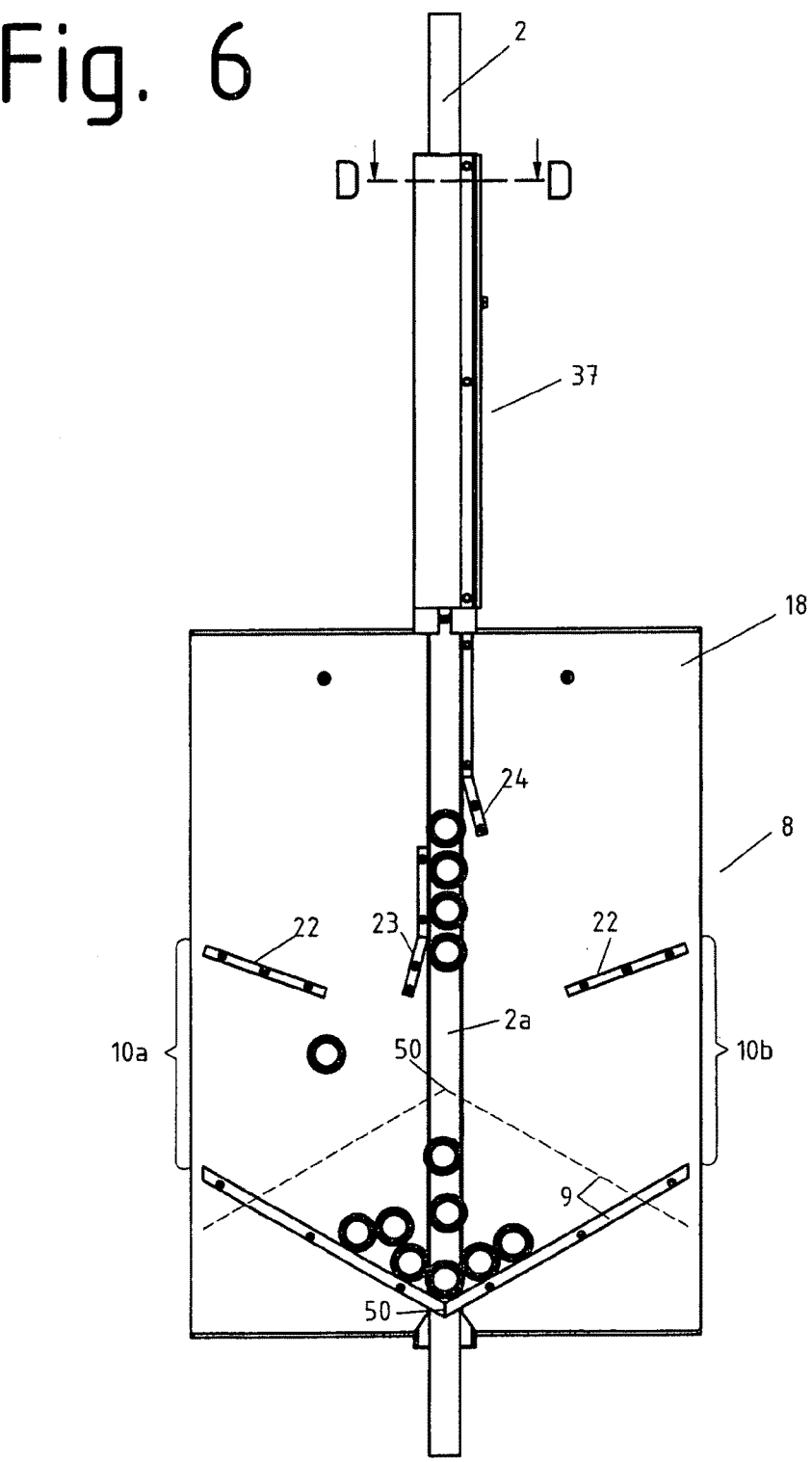
FIG. 6 a detail view of the transfer station

FIG. 6 shows a detail view of a transfer station 8 without a lid 19, which was left out for reasons of clarity, and thereby exposes the view of the bottom 18 of the transfer station, as well as of a first conveying section 37 of the conveying unit 2. The partial section 2a of the conveying unit 2 can be seen centered between the charging openings 10a, 10b, which section is let into the bottom 18 of the transfer station 8, and thus forms a section of the bottom 18.

The crown corks 21 are shown schematically, whereby some have already been acquired by the conveying unit 2a and transported upward, while others are still collecting in a hollow formed by the V-shaped lower delimitation wall 9, particularly at the transfer point 50.

While the embodiment variant of the lower delimitation wall 9 shown with solid lines in FIG. 6, with transfer point 50 as the lowest point of the lower delimitation wall 9, allows particular positioning precision of the crown corks 21 by way of the conveying unit 2 or its partial section 2a, the embodiment variant of the lower delimitation wall 9 also shown in FIG. 6 by means of broken lines, with transfer point 50 as the highest point of the lower delimitation wall 9, facilitates removal of a crown cork 21 that lies on the partial section 2a, since no other crown cork 21 is pressing, from above, onto the crown cork 21 to be removed at that time.

FIG. 6 furthermore shows two baffle plates 22, whose function will still be explained later on, as well as two guide elements 23, 24, which center crown corks 21 picked up by the conveying unit on the conveying unit 2, with slight offset.

Figure 7:
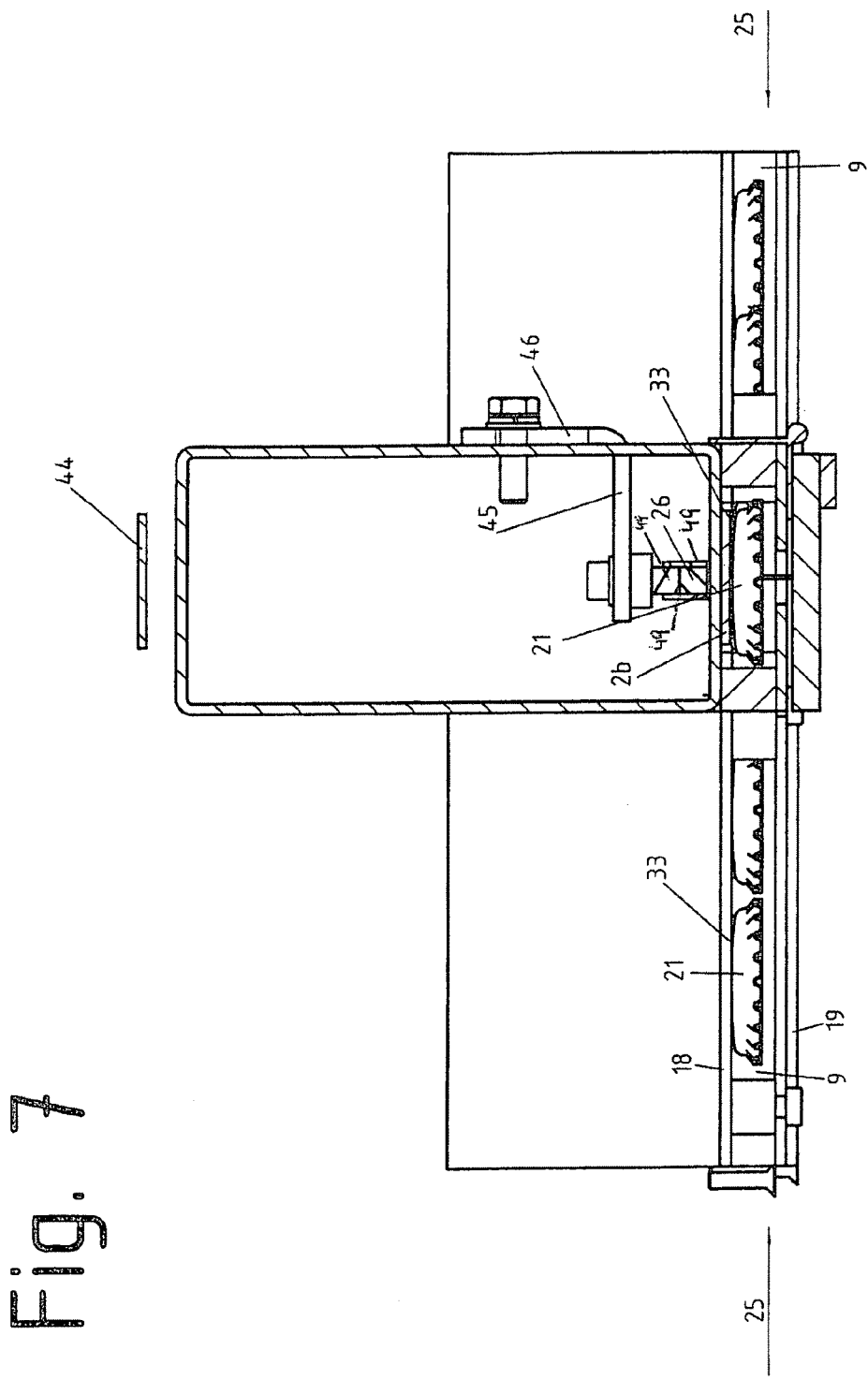
FIG. 7 a sectional view through a device according to the invention, along section line DD from FIG. 6

FIG. 7 is a sectional view through a device according to the invention, along section line DD from FIG. 6, and shows a view from above into the transfer station 8, in other words a view onto the lower delimitation wall 9 of the transfer station 8.

In this view, it can be seen very well that the distance between bottom 18 and lid 19 is selected in such a manner that the crown corks 21 can no longer change their position with reference to the reference surface 33, in other words, that they maintain the position that they have when entering into the transfer station 8 in the direction of the arrows 25, in the transfer station 8, as well, and can only roll off by way of their circumference.

FIG. 7 furthermore shows the run 2b of the conveying unit 2 as well as its return run 44, both of which run on a shaped pipe 48, preferably made of stainless steel, as a conveyor track. A permanent magnet or electromagnet 26 is disposed in the interior of the shaped pipe 48, which magnet is configured essentially in rod shape, with its longitudinal axis running parallel to the run 2b. Multiple such magnets 26 are disposed, one behind the other, along the section of the conveying unit 2 to be magnetized, particularly the first section 37 of the conveying unit 2. In this connection, the magnet 26 is surrounded by soft iron elements 49, which are disposed around the magnet 26 in U shape, in order to guide the magnetic field in the direction of the run 2b. In this connection, the soft iron elements disposed at the sides of the magnet 26 are configured to have a thin wall, while the element disposed opposite the run 2b is configured to have a thick wall, in order to produce a narrow magnetic field that is focused on the run 2b and runs parallel to it.

In this connection, magnet 26 and soft iron elements 49 are held by a bracket holder 45 that is attached to the shaped pipe with an oblong hole 46. The distance of the magnet 26 from the upper run and thus the effect of the magnetic field on the crown corks 21 held on the run 2b can be adjusted by way of the oblong hole.

Figure 12:
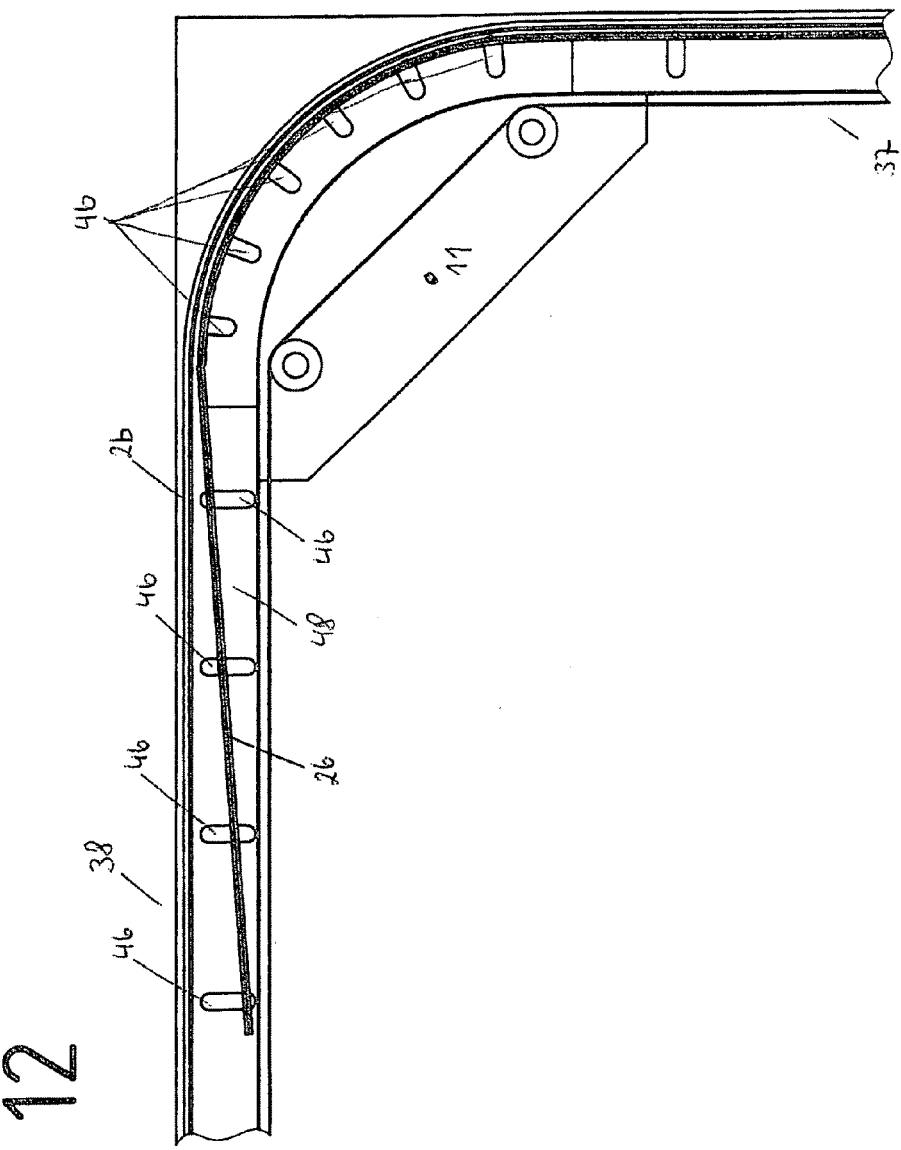
FIG. 12 a detail view, partly in section, of the transition between first and further conveying section of the conveying unit FIG. 13 a top view of a device according to the invention FIG. 14 a section through the transfer station along section line EJ of FIG. 3

FIG. 12 shows a detail view, partly in section, of the transition between first 37 and further 38 conveying section of the conveying unit. In this connection, the magnets 26 are disposed in such a manner that their distance from the run 2b of the conveying unit 2 increases after the transition, seen in the conveying direction, in order to reduce the effect of the magnetic field on the run 2b and thus on the crown corks 21 conveyed on it, as they move.

METHOD OF FUNCTIONING OF THE INVENTION

Below, a detailed description of the method of functioning of the device according to the invention will now follow.

Crown corks 21 are applied to the supply containers 17a, 17b as bulk material, by way of the application unit 15. The division of the bulk material between the individual supply containers 17a, 17b can be controlled by way of the adjustable bulk material distributor 16.

Figure 8:
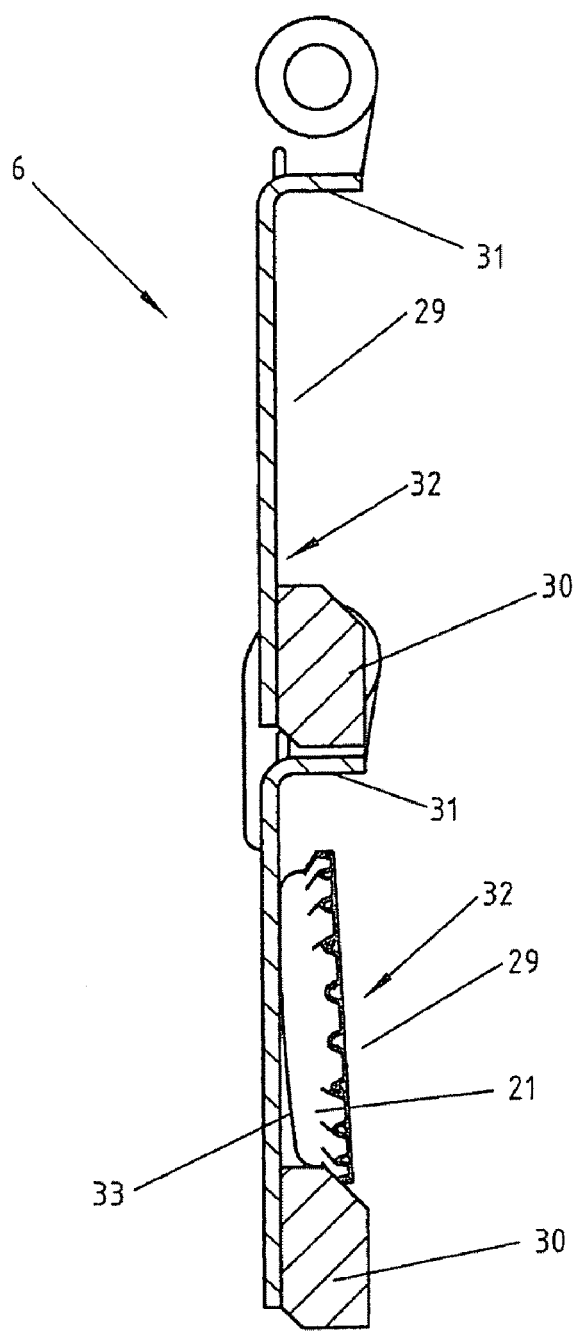
FIG. 8 a sectional view of a detail of the removal conveyor

Subsequently, the crown corks 21 are scooped out of the supply containers 17a, 17b by the removal conveyors 6. For this purpose, the removal conveyors 6 submerge into the amounts of crown corks 21 stored in the supply containers 17a, 17b, in each instance, with their flat conveying sections 6b. In this connection, the crown corks 21 are acquired and entrained by multiple entrainment elements 30 disposed on, for example screwed onto, the removal conveyors 6, which are configured as link belt conveyors. For this purpose, however, the individual links 29 of the removal conveyors 6 have a turned-up end region 31, also for stability reasons. The other end region, in each instance, is formed by an entrainment element 30. Entrainment element 30 and turned-up end region 31 form an accommodation 32 for the crown corks 21 (see FIG. 8), whereby only crown corks as shown in FIG. 8, in other words with their visible surface 33 facing in the direction of the accommodation 32, can be conveyed by way of the steep conveying section 6a, since the gravity position of crown corks 21 entrained in this manner prevents them from tipping out of the accommodation 32. In the event that crown corks 21 come to lie in the accommodation 32 in the opposite orientation from that shown in FIG. 8, in other words with the visible surface 33 facing away from the accommodation 32, crown corks 21 entrained by the entrainment elements 30 in this manner are conveyed by the removal conveyor 6 only as far as the steep conveying section 6b, because of the gravity position and the design of the geometry of the entrainment elements 30, and there they slip out of the accommodation 32 and drop back into the supply container 17a, 17b, in each instance, from which they were removed, and are then scooped up again by the removal conveyor 6, in each instance.

The crown corks 21 are then conveyed along in the removal conveyors 6, with this pre-orientation (reference surface 33 facing in the direction of the accommodation 32), up to the height of the charging openings 10a, 10b. Blow-out openings 14a, 14b are disposed on the opposite side of the charging openings 10a, 10b, in each instance, with reference to the steep conveying section 6a, in each instance, which openings are controlled by a blower unit 13, thereby making it possible to blow air in transverse to the conveying direction of the removal conveyors 6, onto its links, in the plastic panels 5a and 5d, respectively, so that the crown corks 21 held in the individual accommodations 32 of the links 29, in pre-oriented manner, are blown out into the transfer station 8. In this connection, blowing out can either take place row by row, or multiple rows can be blown out at the same time, depending on the arrangement of the openings 14a, 14b. The air blown in can escape again by way of openings 20 in the lid 19 of the transfer station 8.

A filter packet 34, for example a high-surface filter, precedes the blower units, in order to keep the air used to blow out the crown corks 21 as sterile as possible, and to reliably preclude the adhesion of dust or other disruptive elements that could form the basis for subsequent mold formation on the crown corks 21.

Subsequently, after the crown corks 21 have been blown out of the accommodations 32 of the removal conveyors 6, the crown corks 21 fall into the transfer station 8 by way of the charging openings 10a, 10b, in that they make their way toward the lowest point of the transfer station 8, along the lower delimitation wall 9 of the transfer station 8 or along other crown corks 21 that are already situated on it (see also FIG. 6). The lowest point of the transfer station 8 is preferably disposed directly above the partial section 2a of the conveying unit 2, or, to state it more precisely, directly above the run 2b of the partial section 2a of the conveying unit 2. For this purpose, the run 2b is let into the bottom 18 of the transfer station 8 or runs in a groove of the latter.

Charging of the transfer station 8 takes place from both removal conveyors 6. In order to prevent the transfer station from being charged from both removal conveyors 6 at the same time, and the conveyors possibly interfering with one another, it is provided that the relative position of the two removal conveyors 6 with regard to one another is constant during conveying, and either the entrainment elements 30 on the individual links 29 are always positioned differently with regard to their vertical distance from the support plane 7 of the device, or the two charging openings 10a, 10b have a different vertical distance from the support plane 7 of the device. As a result, it is guaranteed that the two removal conveyors 6 never charge the transfer station 8 at the same time, but rather always with a time offset, thereby avoiding reciprocal interference in the charging process.

The transfer station 8 furthermore has baffle plates 22 that are supposed to prevent crown corks 21 from being deflected too far from the lower delimitation wall 9 of the transfer station 8 during charging of the transfer station 8.

The distance between bottom 18 and lid 19 of the transfer station is smaller, in any case, than the diameter of the crown corks 21, and in practice, it is slightly larger than their thickness, so that a change in position of the crown corks 21 with reference to their orientation of the reference surface 33 is not possible. The reference surface 33 is the visible surface 33 of the crown corks 21, which must be handled with particular care, since it is generally provided with a logo or labeling, and this is not allowed to be scratched or actually destroyed during manipulation according to the invention.

The crown corks 21 situated in the transfer station 8 also assume a position above or in front of (depending on the manner of looking at this) the partial section 2b of the conveying unit 2, during the course of their dwell time in the transfer station 8, where they adhere to the run 2b because of its magnetization, and are conveyed further in the conveying direction 35 of the conveying unit 2. Guide plates 23, 24 are also provided in the transfer station 8, for centering the crown corks 21 on the run 2b.

According to the invention, a first conveying section 37 disposed directly behind the transfer station 8, independent of the transfer station 8, of the at least one conveying unit 2 that conveys the separated and position-aligned container closures, is provided, which section has a conveying direction component that faces away from the support plane 7 of the device. In other words, the crown corks 21 are conveyed away upward from the transfer station 8, after they have been separated and position-aligned, with reference to the support plane 7, and therefore the station can also be disposed far down, within the reach of operating personnel. In the present exemplary embodiment, the conveying section 37 runs vertically, although inclined progressions of the conveying section 37 are also possible, as long as they have a conveying direction component that faces away from the support plane 7. The device according to the invention needs a small floor surface, because the crown corks 21 are conveyed away upward from the transfer station 8, and allows rapid conveying upwards of the crown corks 21, which have already been separated and position-aligned, to a height where further transport can take place horizontally.

The term "independent of the transfer station" in this connection is understood to mean that the transfer to the conveying unit 2 must already have been completely terminated in this conveying section 37, i.e. that the crown corks 21 are already completely separated, position-oriented, and aligned in this first conveying section 37 of the conveying unit 2, which lies directly adjacent to the transfer station 8, whereby centering of the crown corks 21 on the run 2b can also take place in a later section, since centering does not change anything with regard to the fundamental separation and position alignment. Conveying of the crown corks in this conveying section 37 is based exclusively on the conveying movement of the conveying unit 2.

The conveying unit 2 itself has further conveying sections following the first conveying section 37, or can also be composed in multi-part manner, i.e. of multiple other conveying units, depending on the distance to the sealing machine. In the present case, the conveying section 37 makes a transition, at a defined height in which horizontal further transport of the crown corks 21 is possible, without disrupting systems that stand on the floor or from which the crown corks 21 can be optimally passed to the sealing machine, to another conveying section 38 that runs horizontally. The curvature axis 11 of the transition between the two conveying sections 37, 38 runs parallel to the surface of the run 2b or to the reference surface 33 of the crown corks 21 being transported on the conveying unit. The transition takes place without deflection rollers and at a large radius, preferably >200 mm, particularly preferably between 300 mm and 600 mm. The bracing device 39 for the conveying unit 2 is disposed at the height of the transfer station 8.

In the conveying section 38, the distance between run 2b and the magnets 26 of the conveying track 48 increases, starting with the transition from the conveying section 37, so that no magnetic force is in effect over a major portion of the conveying section 38. The gentle reduction in the magnetic force prevents a congestion of crown corks 21 from forming at the beginning of the conveying section 38, as would be the case if the magnetic force were suddenly eliminated but crown corks 21 still being held by magnetic force were pushed out of the conveying section 37.

Figure 9:
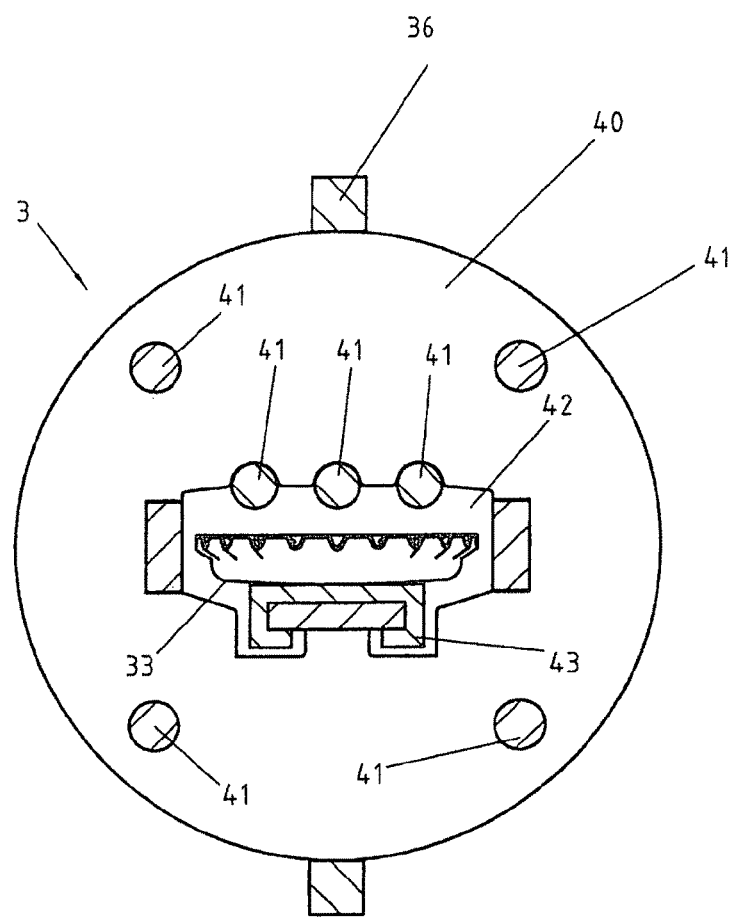
FIG. 9 a sectional view through the gravity channel
Figure 10:
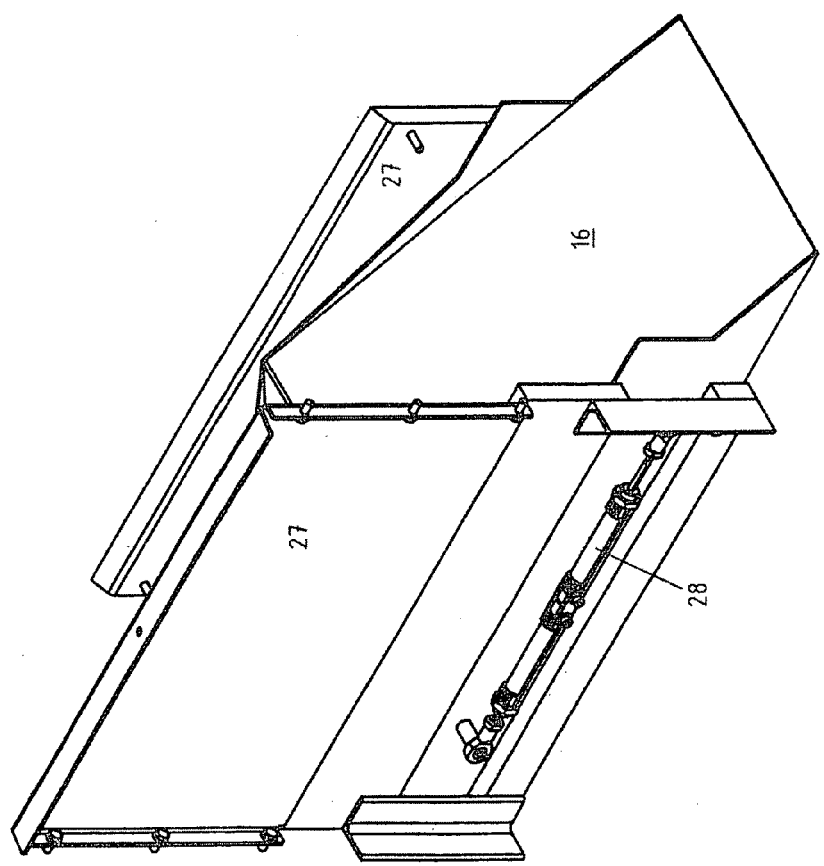
FIG. 10 a detail view of the adjustable bulk material distributor

The conveying section 38, which runs horizontally, has a length that generally reaches to above the sealing machine not shown here. There, the conveying section 38 makes a transition into a gravity channel 3 that is composed of multiple flanges 40, which are all connected with one another by means of rods 41 that pass through the flanges 40 (see FIG. 9). The flanges 40 are additionally connected with one another by means of reinforcement profiles 36 that connect the flanges 40 with one another, in order to additionally reinforce and stabilize the gravity channel 3.

Each flange 40 is provided with a guide recess 42, within which a guide track 43 for crown corks 21 conveyed downward due to the force of gravity is held. The guide track 43 is formed from a plastic that has good slide properties, for example polyethylene (PE) or Teflon (PTFE), in order to handle the reference surface 33 of the crown corks 21 gently.

ALTERNATIVE EMBODIMENT VARIANT OF THE INVENTION

FIGS. 15 to 20 show an alternative embodiment variant of the invention. This alternative embodiment variant is shown on the basis of a device for separation and position alignment of metallic container closures, having only one removal conveyor 6. To a person skilled in the art, however, it is evident that of course, a second removal conveyor in the sense of the exemplary embodiment according to FIGS. 1 to 14 can be provided in the case of this embodiment variant, as well.

Figure 18:
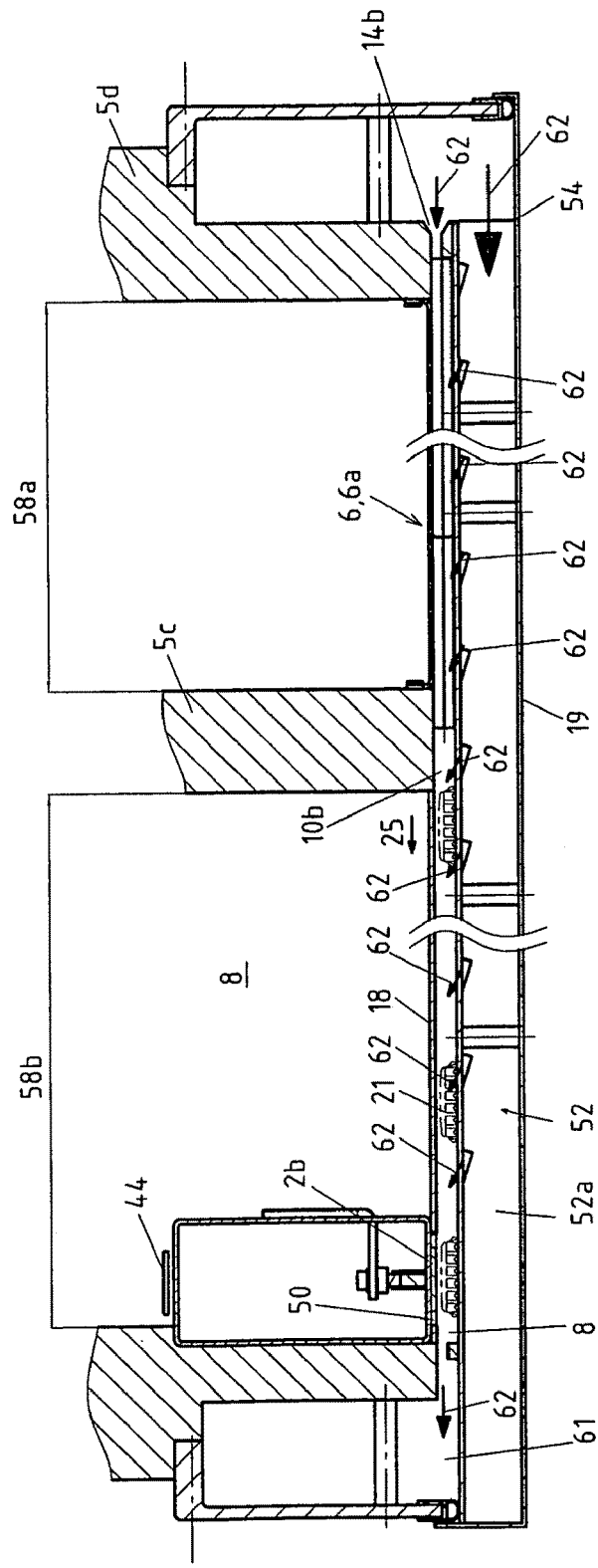
FIG. 18 a sectional view through the alternative embodiment variant of the device according to the invention, along section line LL from FIG. 17
Figure 19:
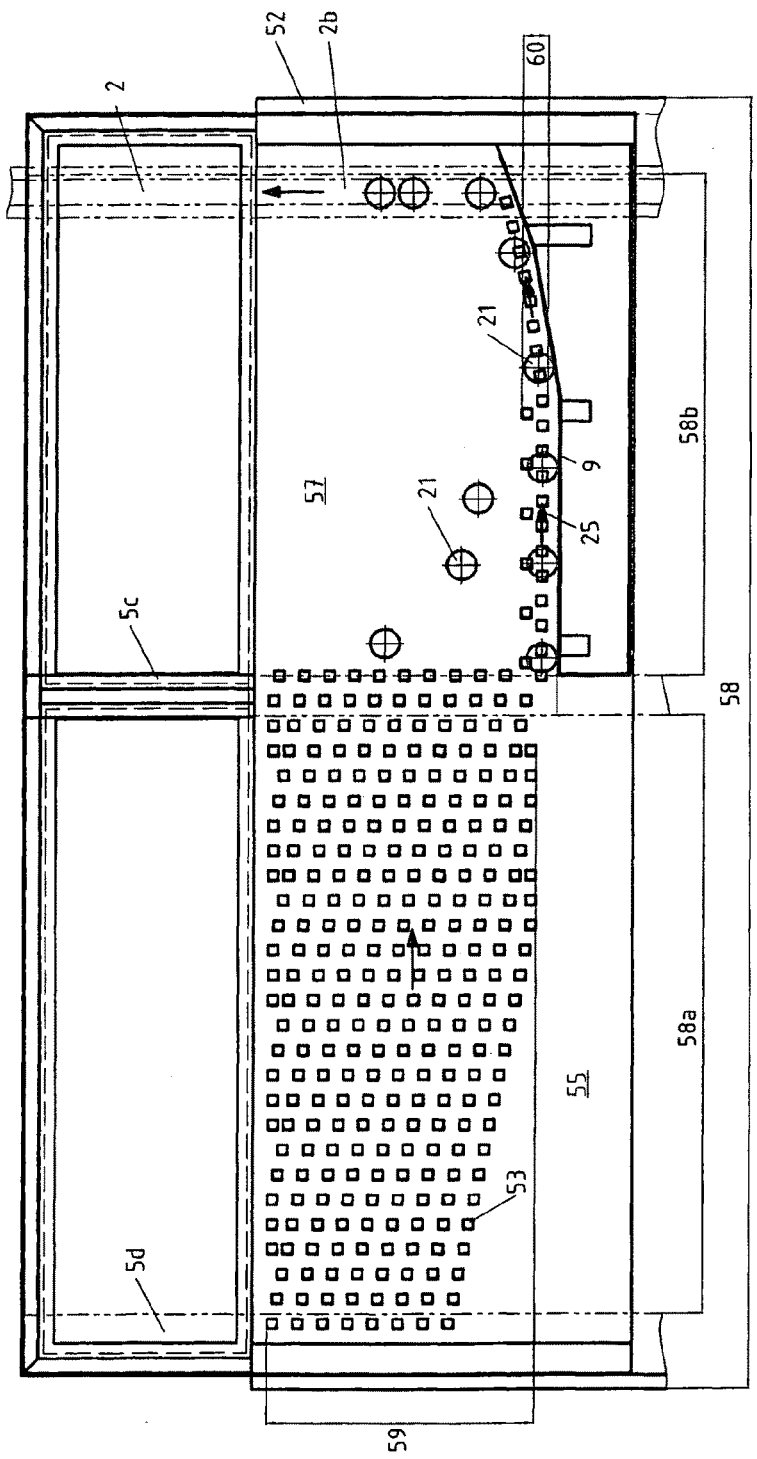
FIG. 19 a sectional view through the alternative embodiment variant of the device according to the invention, along section line KK from FIG. 16

This alternative embodiment variant differs from the embodiment variant described in FIGS. 1 to 14 essentially in that an additional air guide element 52, as shown in FIGS. 18 and 19, is provided, running essentially parallel with regard to the bottom 18 of the transfer station 8 as well as with regard to the steep conveying section 6a of the removal conveyor 6, and therefore forming a type of upper guide. The air guide element 52 thus takes on the functionality of the lid 19 of the transfer station 8 of the embodiment variant described above in FIG. 7, in the region of the transfer station 8, in other words, the distance between bottom 18 and air guide element 52 is selected to be such that the crown corks 21 can no longer change their position with regard to a reference surface 33, in other words, that they maintain the position that they have when entering into the transfer station 8 in the direction of the arrow 25 even in the transfer station 8, and can merely roll off by way of their circumference.

In this connection, the air guide element 52 can be an integral component of the lid 19 or can be installed as a separate part, which borders directly on the lid 19. In this case, the lid 19 does not need any exhaust air openings 20.

The additional air guide element 52 comprises a cavity 52a to which excess pressure is applied, having a lateral opening 54, by way of which the air guide element 52 is supplied with air as a blow-out medium, by way of the air guide channel 56 worked into the plastic panel 5d, which supplies the blow-out openings 14b.

The air guide element 52 furthermore has gill-like openings/slits 53 that are directed at a slant into the interior of the transfer station 8, in order to convey the crown corks 21 in the direction of the run 2b of the conveying unit 2 (direction of the arrow 25 or transfer point 50), which forms a part of the rear wall 18 of the transfer station 8.

Thus, the crown corks 21 are not only blown out of the links of the removal conveyor 6 by way of the blow-out openings 14b, but also experience an additional blow-out pulse by means of the gill-like openings/slits 53 of the air guide element 52, not only in the region of the removal conveyor but also in the region of the transfer station.

Figure 16:
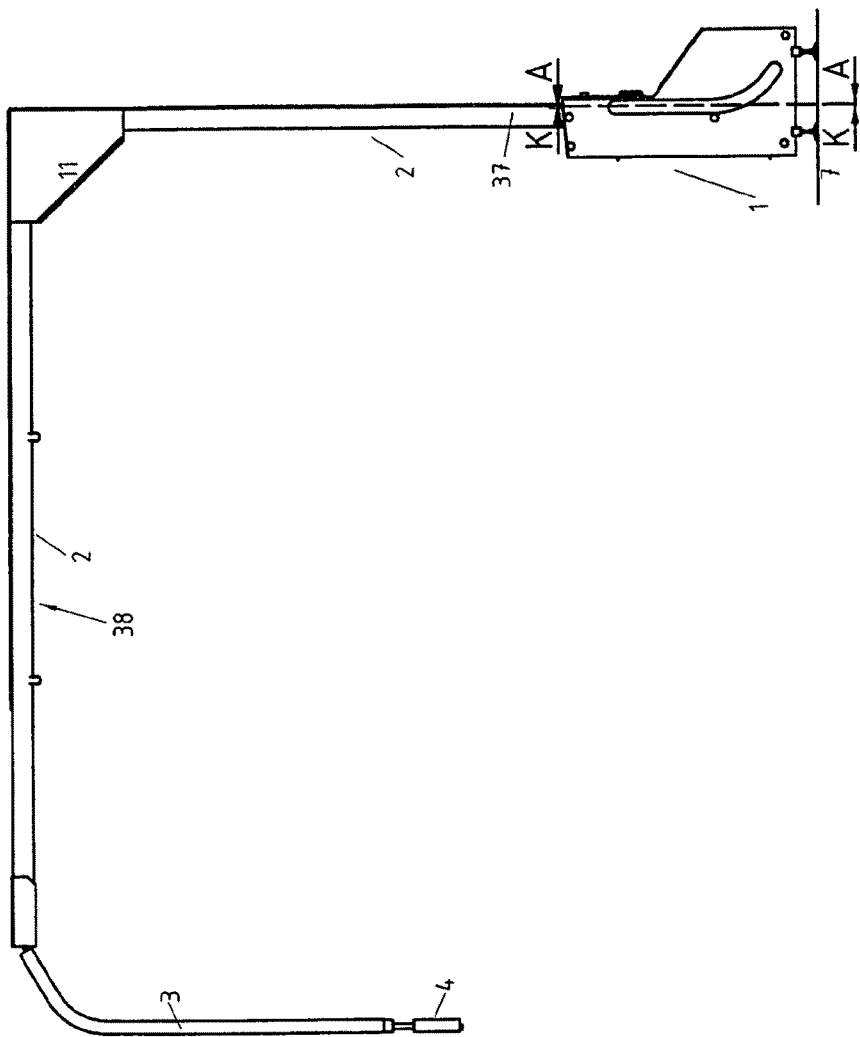

This circumstance is also very well evident from FIG. 19, which represents a sectional view along the line KK from FIG. 16. As can also be seen well here, in addition, the distribution of the gill-like openings/slits 53 varies over the width 58 of the air guide element 52.

In a first section 55 of the air guide element 52, which lies opposite the steep conveying section 6a of the removal conveyor 6, placement of the gill-like openings/slits 53 takes place essentially in planar manner, so that these are disposed to be distributed along the entire width 58a of the steep conveying section 6a of the removal conveyor 6, on the one hand, but on the other hand are also distributed along that height 59 of the steep conveying section 6a within which the crown corks 21 can be or should be blown out into the transfer station 8, by way of the charging openings 10b. In this connection, the distribution of the gill-like openings/slits 53 over the height 59 takes place in such a manner that they are disposed to be distributed over the entire height 59 in the region of the charging opening 10b, but only over a smaller section along this height in the region of the blow-out openings 14b. In this way, the result is achieved that the crown corks 21 are blown out more rapidly in the region of the charging openings 10b than the crown corks 21 that stand behind them, in the region of the blow-out openings 14b, thereby making it possible to prevent crown cork congestion in targeted manner.

In a second section 57 of the air guide element 52, which lies opposite the bottom 18 of the transfer station 8, placement of the gill-like openings/slits 53 takes place essentially in line shape, so that these are disposed distributed along the entire width 58b of the transfer station 8, but at the same time, distributed along a height 60 that essentially corresponds to the diameter of the crown corks 21, following the progression of the lower delimitation wall 9 of the transfer station 8, which wall lies adjacent to the air guide element 52, slightly offset upward.

The provision of the additional air guide element 52 brings about the result that the crown corks 21 lying in the links of the steep conveyor section 6a of the removal conveyor 6 are not only pushed out into the transfer station 8, beginning from the blow-out openings 14b, thus one crown cork pushing the other in front of it, but also all the crown corks of a link of the removal conveyor 6 can be pushed out at the same time.

As a result of this improved blow-out of the crown corks 21 into the transfer station 8, the links of the removal conveyor 6 can be structured to be wider, and two removal conveyors 6 can be replaced by a single removal conveyor 6 having the same width as the total width of the two individual ones, as is the case here in the exemplary embodiment shown in FIGS. 15 to 20.

At this point, however, it should be mentioned that an additional air guide element 52 contributes to an improvement in the blow-out of the crown corks 21 from the removal conveyor 6, in any case, independent of whether the device according to the invention has two removal conveyors 6, as shown in FIGS. 1 to 14, or one removal conveyor 6, as shown in FIGS. 15 to 20. In particular, such an air guide element 52 proves to be advantageous in connection with the configuration of the lower delimitation wall 9 of the transfer station 8 with an elevated transfer point 50 with regard to the remaining regions of the lower delimitation wall 9, as shown with broken lines in FIG. 6, because in this case, the crown corks 21 must be conveyed to the transfer point 50, which lies higher, counter to the force of gravity, something that is supported by the additional blow-out power of the air guide element 52 not only in the region of the removal conveyor(s) 6 but also in the region of the transfer station 8, so that it is obvious that an air guide element 52 according to the invention can be used even in the case of a device as shown in FIGS. 1 to 14.

In the case of the embodiment of the device according to the invention with only one removal conveyor 6, as shown in FIG. 15 to 20, it can furthermore be provided to draw off the air blown into the transfer station 8 by way of the blow-out openings 14b and the gill-like openings/slits 53 off again at the side 61 of the transfer station 8 that lies opposite the blow-out openings 14b.

Figure 17:
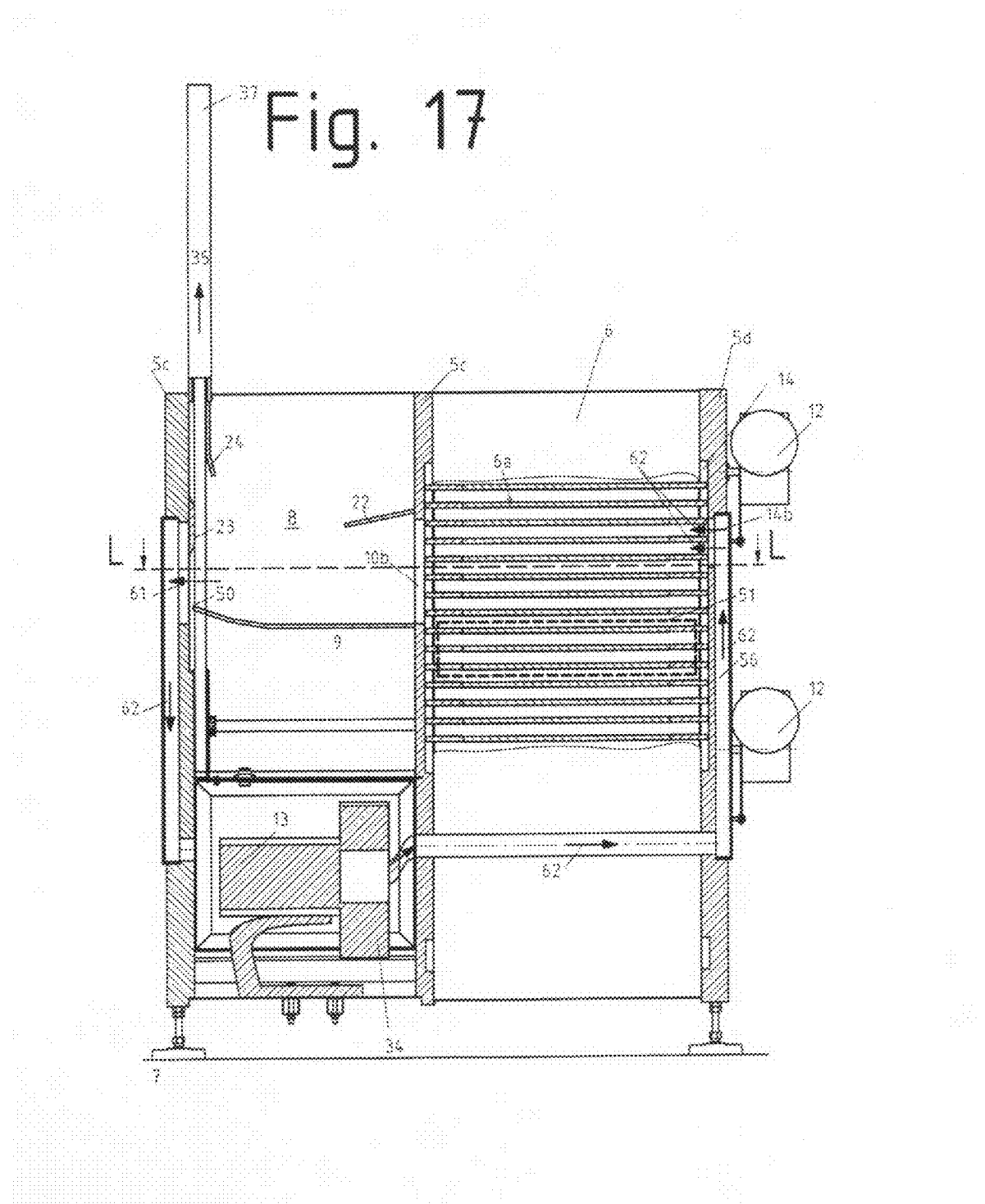

For this purpose, it seems practical to connect the side 61 of the transfer station 8 that lies opposite the blow-out openings 14b with the suction side of the blower unit 13, and the blow-out openings 14b or the air guide channel 56 and thus the cavity 52a with the pressure side of the blower unit 13, thereby making it possible to implement the blow-out air circuit that can be seen in FIG. 17 and is identified by means of the arrows 62.

Figure 20:
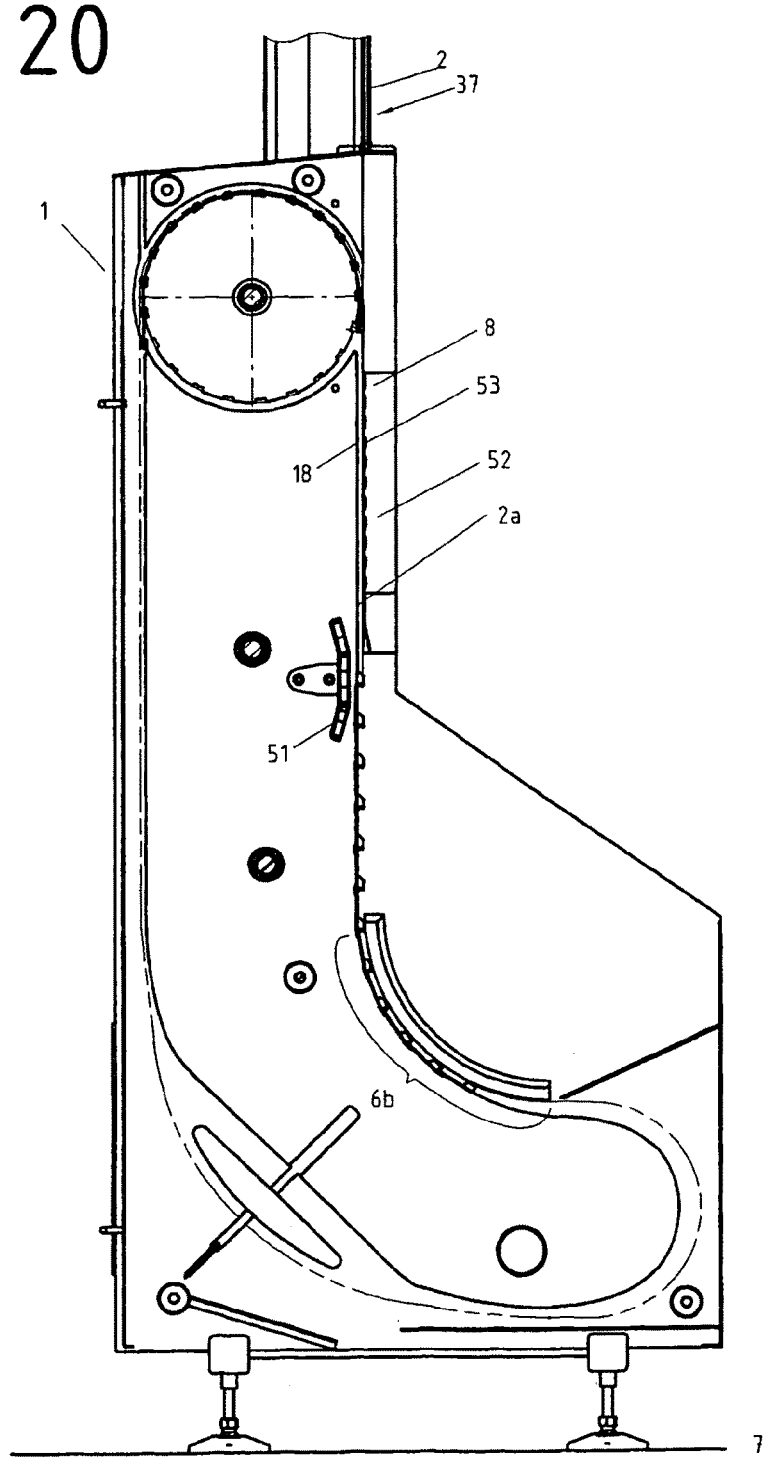
FIG. 20 a sectional view through an alternative embodiment variant of the device according to the invention, along section line MM from FIG. 15

Furthermore, not only in the case of the embodiment variant according to FIGS. 1 to 14 but also in the case of the embodiment variant of FIGS. 15 to 20, it can be provided that a magnet system 51 is disposed behind the steep conveying section 6a of a removal conveyor 6, at the height of the lower delimitation wall 9 of the transfer station 8, in order to bind the crown corks 21 more strongly to the links of the removal conveyor 6 in this section, in order to prevent the crown corks 21 from falling off at this height, and in order to prevent the crown corks 21 from becoming wedged into the cover that is disposed ahead of the steep conveying section 6a at this height. Purely as an example, the placement of such a magnet system with reference to the exemplary embodiment according to FIGS. 15 to 20 is shown in FIGS. 17 and 20.

Purely as an example, removal conveyor 6 and conveying unit 2 in the exemplary embodiment according to FIGS. 15 to 20 are driven by means of separate drive units 12, in order to be able to rapidly implement different conveying velocities.

REFERENCE SYMBOL LIST 1 machine cabinet
2 conveying unit
2a partial section of the conveying unit
2b run and contact surface of the conveying unit
3 gravity channel
4 end piece
5a, 5b plastic panels
5c, 5d plastic panels
6 removal conveyor
6a steep conveying section
6b flat conveying section
7 support plane
8 transfer station
9 lower delimitation wall
10a, 10b charging openings
11 curvature axis
12 drive device
13 blower unit
14a, 14b blow-out openings in plastic panels
15 application unit
16 bulk material distributor
17a, 17b supply container
18 bottom of the transfer station
19 lid of the transfer station
20 exhaust air openings
21 crown corks
22 baffle plates
23 guide element
24 guide element
25 direction arrows
26 magnet
27 holder
28 servomotor
29 links of the removal conveyors
30 entrainment elements 31 turned-up end region
32 accommodation
33 visible surface, reference surface
34 filter packet
35 conveying direction of the conveying unit
36 reinforcement profiles
37 first conveying section of the conveying unit
38 horizontally running conveying section
39 bracing devices for conveying unit
40 flange
41 rods
42 guide recess
43 guide track
44 return run
45 bracket holder
46 oblong hole
47 translation gear mechanism
48 shaped pipe
49 soft iron elements
50 highest point of the lower delimitation wall 9 of the transfer station
51 magnetic system
52 additional air guide element
52a cavity having excess pressure applied to it
53 gill-like openings/slits
54 lateral opening of the air guide element
55 first section of the air guide element
56 air guide channel
57 second section of the air guide element
58 width of the air guide element
58a width of the steep conveying section 6a
58b width of the transfer station
59 height of the distribution of the gill-like openings/slits in the first section of the air guide element
60 height of the distribution of the gill-like openings/slits in the second section of the air guide element
61 side of the transfer station lying opposite the blow-out openings 14b
62 blow-out air circuit

The invention claimed is:

1. Device for separation and position alignment of metallic container closures (21), as well as for conveying the separated and position-aligned container closures (21), preferably crown corks, to a further processing machine, preferably sealing machine, the device comprising
at least one supply container (17a, 17b) and/or application unit (15) for the container closures (21),
at least one removal conveyor (6) for removal and pre-orientation of the container closures (21) from the at least one supply container (17a, 17b), whereby the at least one removal conveyor (6) has a steep conveying section (6a) in the operating position of the device, the conveying surface of which section encloses an angle>30°, preferably >80°, with the support plane, as well as
at least one conveying unit (2) that transports the separated and position-aligned container closures (21) to the further processing machine and contacts the container closures (21) by means of a contact surface (2b), at a reference surface (33) of the container closures, in each instance,
as well as a transfer station (8) in which the container closures are blown out from the steep conveying section (6a) transverse to the conveying direction of the at least one removal conveyor (6), and by means of which station the container closures (21) are passed on to the conveying unit (2) in separated and position-oriented manner,
whereby a first conveying section (37) of the at least one conveying unit (2) that conveys the separated and position-oriented container closures (21), disposed directly behind the transfer station (8), has a conveying direction component that faces away from the support plane (7) of the device, wherein the at least one conveying unit (2) comprises a run (2b) of an endless conveyor belt or link belt or plate belt, which conveys the container closures (21), is guided along a permanently magnetic or electromagnetic conveyor track configured as a magnetic bar, lying on this track at least in sections, or at a slight distance from it, and conveys the container closures (21) out of the transfer station (8).

2. Device according to claim 1, wherein a second conveying section (38) of the at least one conveying unit (2), following the first conveying section (37), running essentially horizontal in the operating position of the device, is provided, whereby a curvature axis (11) of the transition between the two conveying sections (37, 38) runs parallel to the contact surface (2b) of the conveying unit (2) or to the reference surface (33) of the container closures (21) transported on the conveying unit (2), and the transition preferably takes place in deflection-roller-free manner.

3. Device according to claim 1, wherein the transfer station (8) is disposed at a height, measured from the support plane (7) of the device, between 1 m and 3 m, preferably between 1 m and 2 m.

4. Device according to claim 1, wherein the transfer station (8) is disposed directly next to the at least one removal conveyor (6) and comprises a bottom (18) disposed essentially parallel to the steep conveying section (6a) of the removal conveyor (6), as well as a lid (19), whereby at least one charging opening (10a, 10b) is provided, by way of which the container closures (21) can be conveyed from the removal conveyor (6) into the transfer station (8).

5. Device according to claim 4, wherein the distance between bottom (18) and lid (19) allows charging of the transfer station (8) with container closures (21) from the at least one removal conveyor (6), with reference to their reference surface (33), only in that position in which the container closures are transported in the removal conveyor (6).

6. Device according to claim 4, wherein a partial section (2a) of the at least one conveying unit (2) forms a section of the bottom (18) of the transfer station (8), so that the container closures (21) conveyed into the transfer station (8) and pre-oriented, by the at least one removal conveyor (6), come to lie on the conveying unit (2) with their reference surface (33) as a function at least of the amount and of the geometry of the transfer station (8), in accordance with the principle of randomness.

7. Device according to claim 4, wherein a lower delimitation wall (9) of the transfer station (8), in the operating position of the device, is provided, which wall connects bottom (18) and lid (19) with one another and has a lowest point, in the operating position of the device, as a transfer point (50), which point is disposed below the at least one charging opening (10a, 10b) and above the at least one conveying unit (2) provided in the bottom (18) of the transfer station (8).

8. Device according to claim 4, wherein a lower delimitation wall (9) of the transfer station (8), in the operating position of the device, is provided, which wall connects bottom (18) and lid (19) with one another and has a highest point, in the operating position of the device, as a transfer point (50), which point is disposed above the at least one conveying unit (2) provided in the bottom (18) of the transfer station (8).

9. Device according to claim 1, wherein the at least one removal conveyor (6) is an endless link belt conveyor preferably manufactured from corrosion-resistant and/or acid-resistant steel, having a flat conveying section (6*b*) that submerges into the supply container (17*a*, 17*b*), the individual links (29) of which section, seen in the conveying direction, have a first end section that carries an entrainment element (30) provided with a bevel, and a second end section in which the links (29) are preferably configured to be turned up, and the region between the entrainment element (30) and the preferable turn-up is provided for accommodating the container closures (21) in a row, next to one another.

10. Device according to claim 4, wherein at least one blow-out opening (14*a*, 14*b*) controlled by a blower unit (13) is disposed in the region of the at least one charging opening (10*a*, 10*b*), in order to convey the container closures (21) from the at least one removal conveyor (6) into the transfer station (8), row by row.

11. Device according to claim 7, wherein an additional air guide element (52) is provided, which is disposed to run parallel to the lid (19), preferably to be an integral part of the lid (19), to cover at least one region of the steep conveyor section (6*a*) and at least one region of the transfer station (8), and has openings/slits (53) directed into the transfer station (8) and/or onto the steep section (6*a*), controlled by a blower unit (13), in order to convey the container closures (21) from the steep conveying section (6*a*), row by row, into the transfer station (8), on the one hand, and to convey the container closures (21) that are already situated in the transfer station (8) in the direction of the transfer point (50), on the other hand.

12. Device according to claim 1, wherein the at least one conveying unit (2) has a first conveying velocity and the at least one removal conveyor (6) has a second conveying velocity and the first conveying velocity of the at least one conveying unit (2) amounts to a multiple of the second conveying velocity of the at least one removal conveyor (6).

13. Device according to claim 1, wherein the width of the run (2*b*) of the conveyor belt of the at least one conveying unit (2) is less than or equal to the greatest width of the container closures (21) to be conveyed.

14. Device according to claim 4, wherein the steep conveying section (6*a*) of the removal conveyor (6), bottom (18) and lid (19) of the transfer station (8), as well as the first conveying section (37) of the conveying unit (2) are disposed to run vertically.

15. Device according to claim 9, wherein a magnetic system (51) is disposed on the side of the at least one removal conveyor (6) that faces away from the entrainment elements (30) of the steep conveying section (6*a*).

16. Device according to claim 1, wherein two removal conveyors (6) that run parallel to one another are provided, and the transfer station (8) as well as a conveying unit (2) that transports the separated and position-aligned container closures (21) to the further processing machine is disposed between the removal conveyors (6), whereby the transfer station (2) has two charging openings.

17. Device according to claim 16, wherein the relative position of the two removal conveyors (6) with regard to one another is constant during conveying, and either the entrainment elements (30) on the individual links (29) are always positioned differently with reference to their vertical distance from the support plane (7) of the device, or the two charging openings (10*a*, 10*b*) have a different vertical distance from the support plane (7) of the device.

18. Device according to claim 16, wherein the lower delimitation wall (9) of the transfer station (8) is configured in V shape, whereby each shank connects the lowest point of a charging opening (10*a*, 10*b*), in each instance, with the lowest point of the transfer station (8), with reference to the support plane (7).

19. Device according to claim 16, wherein an application unit (15) is provided between the two removal conveyors (6) and below the transfer station (8), in the operating position of the device, which unit has a preferably wedge-shaped bulk material distributor (16) that divides the container closures (21) to be separated and position-aligned and fed in, between the two removal conveyors (6).

20. Device according to claim 19, wherein the bulk material distributor (16) is movably disposed between the removal conveyors (6), in order to be able to influence the division ratio of the container closures (21) that are applied, between the two removal conveyors (6).

21. Device according to claim 1, wherein a gravity channel (3) is disposed between conveying unit (2) and further processing machine, which channel has a guide track (43) on which the container closures (21) slide in the direction toward the further processing machine, due to gravity, and the guide track (43) is formed from plastic or is provided with a coating composed of plastic, at least in the contact region with the container closures (21).

22. Device according to claim 1, wherein the container closures (21) are crown corks and the reference surface (33) is formed by the back of the crown corks.

\* \* \* \* \*